(12) United States Patent
Takashima et al.

(10) Patent No.: US 7,277,117 B2
(45) Date of Patent: Oct. 2, 2007

(54) COMMUNICATION CONTROL APPARATUS, COMMUNICATION APPARATUS, COMMUNICATION SYSTEM, AND METHOD OF THE SAME

(75) Inventors: Masatoshi Takashima, Tokyo (JP); Toshiyuki Ishii, Chiba (JP); Yuji Morimiya, Chiba (JP); Hiroshi Yasutomi, Tokyo (JP)

(73) Assignee: Sony Corporation, Tokyo (JP)

( * ) Notice: Subject to any disclaimer, the term of this patent is extended or adjusted under 35 U.S.C. 154(b) by 1445 days.

(21) Appl. No.: 09/862,963

(22) Filed: May 22, 2001

(65) Prior Publication Data

US 2001/0047300 A1 Nov. 29, 2001

(30) Foreign Application Priority Data

May 24, 2000 (JP) ............................. 2000-157992

(51) Int. Cl.
*H04N 7/14* (2006.01)
(52) U.S. Cl. ............................... 348/14.09; 348/14.08; 370/260
(58) Field of Classification Search .. 348/14.01–14.09, 348/14.1, 14.11–14.13; 370/260, 261; 709/204; 705/14

See application file for complete search history.

(56) References Cited

U.S. PATENT DOCUMENTS

| | | | |
|---|---|---|---|
| 5,886,735 A | 3/1999 | Bullister | |
| 6,061,716 A | 5/2000 | Moncreiff | |
| 6,084,628 A * | 7/2000 | Sawyer | 725/34 |
| 6,339,842 B1 * | 1/2002 | Fernandez et al. | 725/133 |
| 6,546,016 B1 * | 4/2003 | Gerszberg et al. | 370/401 |
| 6,600,725 B1 * | 7/2003 | Roy | 370/261 |

FOREIGN PATENT DOCUMENTS

| | | | |
|---|---|---|---|
| JP | 05-260193 | * | 10/1993 |
| JP | 410075432 A | * | 3/1998 |
| WO | WO99 12349 | | 3/1999 |

OTHER PUBLICATIONS

Tanigawa H. et al: "Personal multimedia-multipoint teleconference system" Networking in the Nineties. Bal Harbour, Apr. 7-11, 1991, Proceedings of the Annual Joint Conference of the Computer and Communications Societies (INFOCOM), New York, IEEE, US, vol. 2 Conf. 10, Apr. 7, 1991, pp. 1127-1134, XP010042502 ISBN: 0-87942-694-2.

Patent Abstracts of Japan, vol. 1999, No. 04, Apr. 30, 1999 & JP 11 003348 A (Sharp Corp), Jan. 6, 1999.

* cited by examiner

*Primary Examiner*—Melur Ramakrishnaiah
(74) *Attorney, Agent, or Firm*—Frommer Lawrence & Haug LLP; William S. Frommer; Paul A. Levy

(57) ABSTRACT

A system friendly to users engaged in multipoint communication, wherein Multipoint communication using a plurality of multipoint communication terminal apparatuses connected via a fixed telephone line network, IP network, and a cellular phone line network is controlled by an MCU. The MCU controls communication so that a signal received from the multipoint communication terminal apparatuses and a signal for providing predetermined advertising information are transmitted to the multipoint communication terminal apparatuses.

50 Claims, 15 Drawing Sheets

PRESS BUTTON "1"

COMMUNICATION CONTROL APPARATUS, COMMUNICATION APPARATUS, COMMUNICATION SYSTEM, AND METHOD OF THE SAME

BACKGROUND OF THE INVENTION

1. Field of the Invention

The present invention relates to a communication control apparatus, communication apparatus, and communication system used for communication among a plurality of points via communication lines and a method of the same.

2. Description of the Related Art

In recent years, due to advances in communication and computer technology, it has become possible for users to engage in multipoint communication (party communication) for communication with a plurality of users by connecting a camera and microphone to a personal computer at home without purchasing a large scale expensive system like a television conference system and by transferring images and sounds in real time between a plurality of personal computers via a network.

When a service provider of such a multipoint communication provides this service, there is a demand for developing a system which is user friendly and convenient for the service provider in business.

The present invention was made in consideration with the above disadvantages of the related art and has as an object thereof to provide a communication control apparatus, communication apparatus, and communication system friendly to users of multipoint communication and a method thereof.

SUMMARY OF THE INVENTION

An object of the present invention is to provide a communication control apparatus, communication apparatus, and communication system convenient for a service provider of multipoint communication in business and a method thereof.

To solve the above problem of the related art and achieve the above object, the communication control apparatus of a first aspect of the present invention is a communication control apparatus for controlling multipoint communication using a plurality of communication apparatuses connected via communication lines, comprising a control means for controlling communication so as to transit signals received from the plurality of communication apparatuses and a signal for providing predetermined advertising information to the plurality of communication apparatuses.

According to a first aspect of the present invention, there is provided a communication control apparatus receives signals from the plurality of communication apparatuses.

Then, the control means of the communication control apparatus controls communication to transmit the signals received from the plurality of communication apparatuses and a signal for providing predetermined advertising information to the plurality of communication apparatuses.

As a result, the plurality of communication apparatuses display etc. common advertising information together with the display etc. in accordance with the signals for multipoint communication.

Also, in the communication control apparatus of the first aspect of the present invention, preferably the control means controls communication so that the communication apparatuses display images in accordance with the signals received from the plurality of communication apparatuses and an image in accordance with the signal for providing the predetermined advertising information on one screen.

Further, in the communication control apparatus of the first aspect of the invention, preferably the control means determines the type of advertising information to be provided in accordance with an instruction from a communication apparatus and controls communication so as to transmit a signal for providing the determined type of the advertising information to the communication apparatuses.

Further, in the communication control apparatus of the first aspect of the invention, preferably the control means assigns a predetermined selection right to a communication apparatus and allows the communication apparatus assigned the selection right to give the instruction.

Further, in the communication control apparatus of the first aspect of the invention, preferably the control means changes the communication apparatus assigned the selection right in accordance with a request from a communication apparatus.

Further, in the communication control apparatus of the first aspect of the invention, preferably the control means transmits a signal for a display for specifying the communication apparatus assigned the selection right to the plurality of communication apparatuses.

Further, in the communication control apparatus of the first aspect of the invention, preferably the control means determines whether or not to transmit a signal for providing the advertising information in accordance with an instruction from a communication apparatus.

Further, in the communication control apparatus of the first aspect of the invention, preferably the signals received from the communication apparatuses are signals for displaying faces of users of the communication apparatuses.

Further, in the communication control apparatus of the first aspect of the invention, preferably the control means controls communication so that a communication apparatus displays a second image in accordance with the predetermined advertising information larger compared with first images in accordance with signals received from the plurality of communication apparatuses.

Further, in the communication control apparatus of the first aspect of the invention, preferably the control means controls communication so that the second image is displayed below the first images in a display screen of the communication apparatus.

Further, the communication control apparatus of the first aspect of the invention preferably further comprises a charging means for determining fees to be charged to users of the communication apparatuses for use of the multipoint communication in accordance with provision of the advertising information.

Further, in the communication control apparatus of the first aspect of the invention, preferably the control means controls communication so as to transmit sound signals received from the plurality of communication apparatuses to the plurality of communication apparatuses.

According to a second aspect of the present invention, there is provided a communication control apparatus for controlling multipoint communication performed using a plurality of communication apparatuses connected via communication lines, comprising a control means for controlling communication so as to transmit signals received from the plurality of communication apparatuses and a content signal specified by a communication apparatus to the plurality of communication apparatuses.

The action of the communication control apparatus according to the second aspect of the present invention is as follows.

The communication control apparatus receives signals from the plurality of communication apparatuses.

Then, the control means of the communication control apparatus controls communication to transmit the signals received from the plurality of communication apparatuses and a content signal specified by a communication apparatus to the plurality of communication apparatuses.

As a result, the plurality of communication apparatuses display etc. common content as well as a display etc. in accordance with signals for multipoint communication.

Further, in the communication control apparatus of the second aspect of the invention, preferably the control means controls communication so that the communication apparatuses display images in accordance with the signals received from the plurality of communication apparatuses and an image in accordance with the content signal on one screen.

Further, in the communication control apparatus of the second aspect of the invention, preferably the control means assigns a predetermined selection right to a communication apparatus and allows the communication apparatus assigned the selection right to designate the content signal.

Further, in the communication control apparatus of the second aspect of the invention, preferably, when the signals received from the plurality of communication apparatuses are sound signals, the control means recognizes sounds indicated by the sound signals and controls communication so as to transmit signals indicating the recognized sounds by text to the plurality of communication apparatuses.

According to a third aspect of the present invention, there is provided a communication control apparatus for transmitting signals for displaying images to a communication apparatus, comprising a control means for transmitting to the communication apparatus information for controlling communication so as to display a plurality of images at positions on a screen of a display means of the communication apparatus corresponding to an arrangement of a plurality of operation buttons of an operation means of the communication apparatus and signals for displaying the plurality of images.

Further, in the communication control apparatus of the third aspect of the invention, preferably, when receiving an operation signal of an operation button of the communication apparatus, the control means transmits to the communication apparatus an image relating to an image corresponding to the operation button specified by the operation signal.

Further, in the communication control apparatus of the third aspect of the invention, preferably the control means controls communication so that information indicating correspondence of the plurality of operation buttons and the plurality of images is displayed on the display means of the communication apparatus.

Further, in the communication control apparatus of the third aspect of the invention, preferably the control means controls multipoint communication performed using a plurality of communication apparatuses connected via communication lines.

According to a four aspect of the present invention, there is provided a communication apparatus for multipoint communication with a plurality of other communication apparatuses via communication lines, comprising a receiving means for receiving first signals transmitted by the plurality of other communication apparatuses and a second signal indicating predetermined advertising information and a signal processing means for processing for simultaneously displaying images in accordance with the first signals and an image in accordance with the second signal.

According to a fifth aspect of the present invention, there is provided a communication apparatus for multipoint communication with a plurality of other communication apparatuses via communication lines, comprising a receiving means for receiving first signals transmitted by the other plurality of communication apparatuses and a second signal of a content designated by the communication apparatus; a display means; and a signal processing means for simultaneously displaying by the display means images in accordance with the first signals and an image in accordance with the second signal.

According to a sixth aspect of the present invention, there is provided a receiving means for receiving signals of a plurality of images together with display position instruction information; an operation means comprising a plurality of operation buttons; a display means; and a signal processing means for signal processing so that the plurality of images are displayed at positions on a screen of the display means corresponding to an arrangement of the plurality of operation buttons based on the display position instruction information.

Further, in the communication apparatus according to the sixth aspect of the invention, preferably the signal processing means displays information indicating correspondence of the plurality of operation buttons and the plurality of images on the display means based on the display position instruction information.

According to a seventh aspect of the present invention, there is provided a communication system for multipoint communication using a plurality of communication apparatuses via communication lines under control by a communication control apparatus, wherein the communication control apparatus comprises a control means for controlling communication so as to transmit first signals received from the plurality of communication apparatuses and a second signal for providing predetermined advertising information to the plurality of communication apparatuses; and the communication apparatus comprises a display means and a signal processing means for processing so as to display images in accordance with the first signals and an image in accordance with the second signal on one screen by a display means.

According to a eighth aspect of the present invention, there is provided a communication system for multipoint communication using a plurality of communication apparatuses via communication lines under control by a communication control apparatus, wherein the communication control apparatus comprises a control means for controlling communication so as to transmit first signals received from the plurality of communication apparatuses and a second signal of a content designated by the communication apparatus to the plurality of communication apparatuses; and the communication apparatus comprises a display means and a signal processing means for processing so as to display images in accordance with the first signals and an image in accordance with the second signal on one screen by a display means.

According to a ninth aspect of the present invention, there is provided a communication system for multipoint communication using a plurality of communication apparatuses via communication lines under control by a communication control apparatus, wherein the communication control apparatus comprises a control means for transmitting display position instruction information and signals of a plurality of images to the communication apparatus; and the communication apparatus comprises an operation means comprising a plurality of operation buttons; a display means; and a signal processing means for signal processing so as to display the plurality of images in accordance with signals received from the communication control apparatus at positions on a screen of the display means corresponding to an arrangement of the plurality of operation buttons based on the display position instruction information received from the communication control apparatus.

According to a 10th aspect of the present invention, there is provided a communication method for controlling multipoint communication using a plurality of communication apparatuses connected via communication lines, including the step of controlling communication so as to transmit signals received from the plurality of communication apparatuses and a signal for providing predetermined advertising information to the plurality of communication apparatuses.

Further, a communication method of a 10th aspect of the invention preferably includes the step of controlling communication so that the communication apparatuses display images in accordance with signals received from the plurality of communication apparatuses and an image in accordance with the signal for providing the predetermined advertising information on one screen.

According to a 11th aspect of the present invention, there is provided a communication method for controlling multipoint communication using a plurality of communication apparatuses connected via communication lines, including the step of controlling communication so as to transmit signals received from the plurality of communication apparatuses and a content signal designated by a communication apparatus to the plurality of communication apparatuses.

According to a 12th aspect of the present invention, there is provided a communication method for transmitting a signal for displaying an image to a communication apparatus, including the step of transmitting to the communication apparatus information for controlling communication so as to display a plurality of images at positions on a screen of a display means of the communication apparatus corresponding to an arrangement of a plurality of operation buttons of an operation means of the communication apparatus and signals for displaying the plurality of images.

According to a 13th aspect of the present invention, there is provided a communication control apparatus for controlling multipoint communication using a plurality of communication apparatuses connected via communication lines, comprising a control means for controlling communication so as to transmit first signals indicating pickup results of faces of users of the communication apparatuses received from the plurality of communication apparatuses and second signals indicating pickup results in the directions of the users' perspectives to the plurality of communication apparatuses.

Further, in the communication control apparatus according to the 13 aspect of the invention, preferably the control means controls communication so that first images in accordance with the first signals and second images in accordance with the second signals are displayed in correspondence on one screen by the display means of the communication apparatus.

According to a 14th aspect of the present invention, there is provided a communication apparatus for multipoint communication with a plurality of other communication apparatuses via communication lines, comprising a receiving means for receiving signals; a display means for display in accordance with the received signals; a first image pickup means for picking up an image of a face of a user of the communication apparatus; a second image pickup means for picking up an image in the direction of the user's perspective; and a transmission means for transmitting signals indicating the image pickup results of the first image pickup means and the second image pickup means.

Further, a communication apparatus according to a 14th aspect of the invention, preferably the display means displays first images in accordance with image pickup results of faces of users of the plurality of other communication apparatuses and second images in accordance with image pickup results in the directions of the users' perspectives.

Further, in the communication apparatus according to the 14th aspect of the invention, preferably the display means displays the first images and the second images in correspondence on one screen.

According to a 15th aspect of the present invention, there is provided a communication method for controlling multipoint communication using a plurality of communication apparatuses connected via communication lines, including the step of controlling communication so as to transmit first signals indicating image pickup results of faces of users of the communication apparatuses received from the plurality of communication apparatuses and second signals indicating image pickup results in the directions of the users' perspectives to the plurality of communication apparatuses.

Further, the communication method according to a 15th aspect of the invention includes the step of controlling communication so that first images in accordance with the first signals and second images in accordance with the second signals are displayed in correspondence on one screen in the display means of the communication apparatuses.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, preferred embodiments will be described with reference to the accompanying drawings.

Below, a multipoint communication system according to an embodiment of the present invention will be explained.

Figure 1:
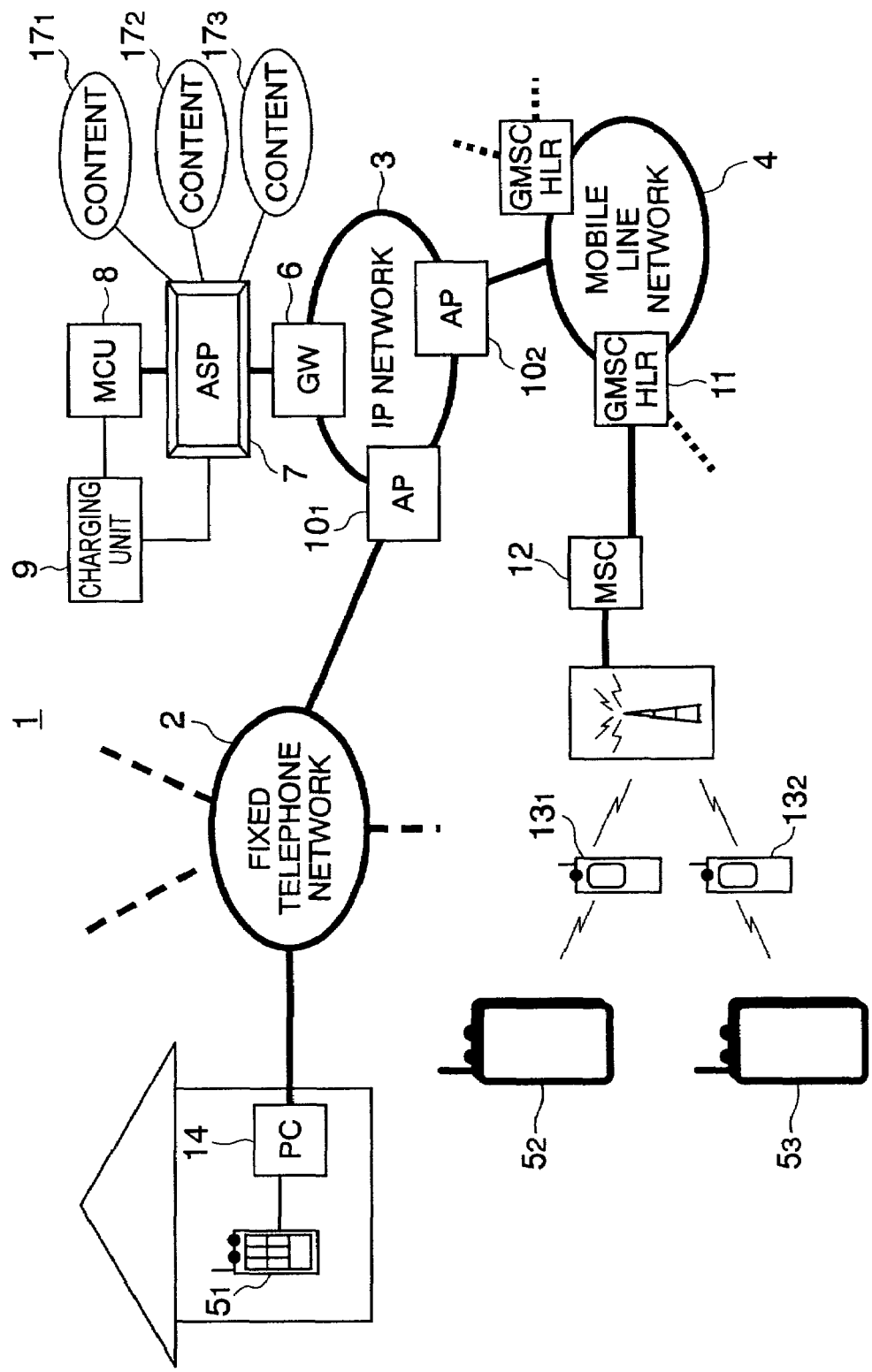
FIG. 1 is a view of the configuration of a multipoint communication system according to a first embodiment of the present invention.

FIG. 1 is a view of the overall configuration of a multipoint communication system 1 of the present embodiment.

As shown in FIG. 1, in the multipoint communication system 1, for example, multipoint communication terminal apparatuses $5_1$, $5_2$, and $5_3$ perform multipoint communication via a fixed telephone line network 2, an IP (Internet Protocol) network 3, and a cellular phone line network 4. Note that the number of multipoint communication terminal apparatuses for multipoint communication may be any as far as it is two or more and that the type of line network etc. connected to the multipoint communication terminal apparatuses is not specifically limited.

The IP network 3 is connected to an ASP (Application Service Provider) 7 and an MCU (Multipoint Control Unit) 8 via a gateway 6. Also, the ASP 7 and the MCU 8 are connected to a charging unit 9.

Here, the ASP 7 and MCU 8 correspond to a control means of a communication control apparatus and a communication system of the present invention.

Also, the charging unit 9 corresponds to a charging means of the communication control apparatus of the present invention.

Also, the fixed telephone line network 2 is connected to the IP network 3 via an access point $10_1$, while the cellular phone line network 4 is connected to the IP network 3 via an access point $10_2$.

Also, the multipoint communication terminal apparatus $5_1$ is, for example, connected to the fixed telephone line network 2 via a personal computer 14 at home.

Also, the multipoint communication terminal apparatuses $5_2$ and $5_3$ are connected to a gateway mobile exchange 11 of the cellular phone line network 4 via cellular phones $13_1$ and $13_2$ and a mobile exchange 12.

First, the main characteristics of a multipoint communication system 1 will be explained.

In the multipoint communication system 1, functions of the MCU 8 enable, for example, multipoint communication between the multipoint communication terminal apparatuses $5_1$, $5_2$, and $5_3$.

At this time, signals (video and sound) from the multipoint communication terminal apparatuses $5_1$ to $5_3$ are collected at the MCU 8 and combined there to a signals to be reproduced by the multipoint communication terminal apparatuses. At this time, it is sufficient that MCU 8 perform processing and control so that the multipoint communication terminal apparatuses can obtain the output of the combined signals. Processing for generating combined signals to be finally output may also be performed in the multipoint communication terminal apparatuses.

At this time, for example, video signals of faces of users etc. transmitted by other multipoint communication terminal apparatuses and a content signal like a commercial provided by the ASP 7 etc. are transmitted to the multipoint communication terminal apparatuses.

Below, main components of the multipoint communication system 1 will be explained.

(Multipoint Communication Terminal Apparatuses $5_1$ to $5_3$)

Figure 2:
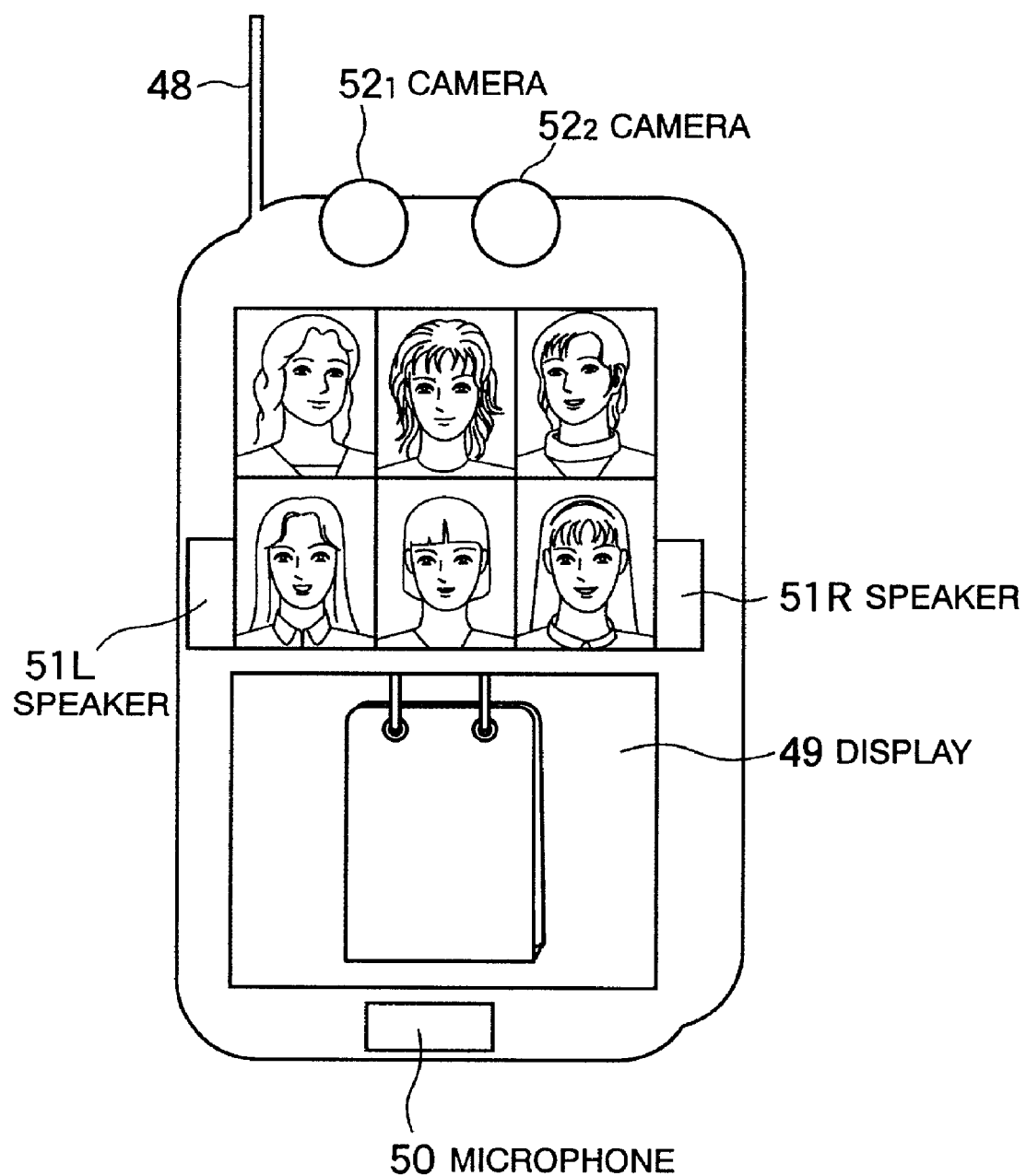
FIG. 2 is a view of the appearance of the front of a multipoint communication terminal apparatus shown in FIG. 1.
Figure 3:
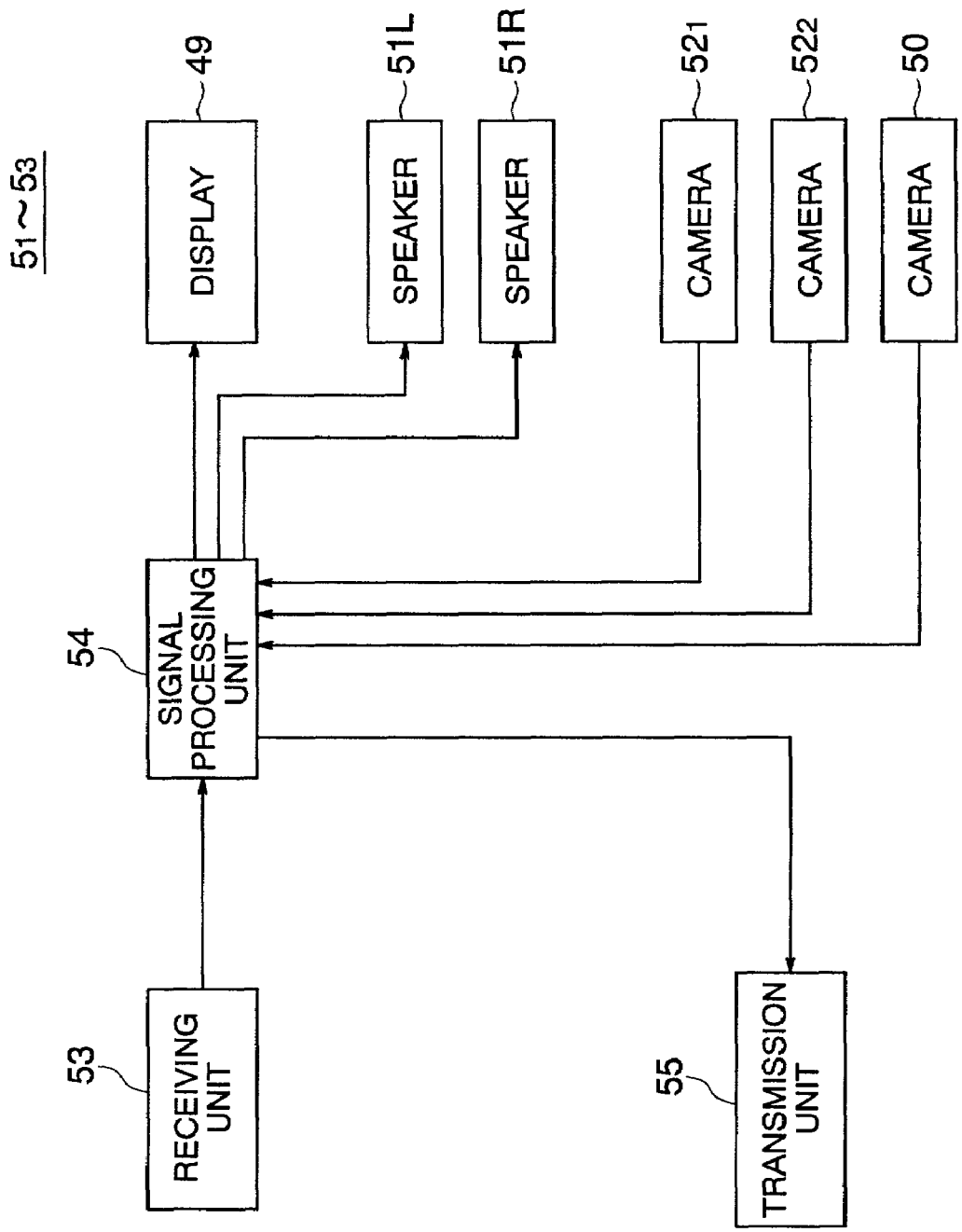
FIG. 3 is a view of the configuration of the multipoint communication terminal apparatus shown in FIG. 1.

FIG. 2 is a view of the appearance of the front of the multipoint communication terminal apparatuses $5_1$ to $5_3$, while FIG. 3 is a view of the configuration of the multipoint communication terminal apparatuses $5_1$ to $5_3$.

As shown in FIG. 2, the front side of each of the multipoint communication terminal apparatuses $5_1$ to $5_3$ is provided with an antenna 48, a display 49, speakers 51R and 51L placed on the two sides of the display 49, cameras $52_1$ and $52_2$ placed above the display 49 in the figure, and a microphone 50 placed below the display 49 in the figure.

Here, the camera $52_1$ is a camera for picking up an image of a view of a direction of the perspective of the user of each of the multipoint communication terminal apparatuses $5_1$ to $5_3$ and corresponds to a second image pickup means or the present invention.

Further, the camera $52_2$ is a camera for picking up an image of the face of the user of each of the multipoint communication terminal apparatuses $5_1$ to $5_3$ and corresponds to a first image pickup means of the present invention.

The antenna 48 transmits and receives a signal to and from a personal computer 14 in the case of the multipoint communication terminal apparatus $5_1$ shown in FIG. 1.

Also, the antenna 48 transmits and receives signals to and from cellular phones $13_1$ and $13_2$ in the case of the multipoint communication terminal apparatuses $5_2$ and $5_3$ shown in FIG. 1.

Also, as shown in FIG. 3, each of the multipoint communication terminal apparatuses $5_1$ to $5_3$ comprises a receiving unit 53, a signal processing unit 54, a display 49, a microphone 50, speakers 51L and 51R, cameras $52_1$ and $52_2$, and a transmission unit 55.

Here, the receiving unit 53, signal processing unit 54, and display 49 correspond to a receiving means, signal processing means, and display means of a communication apparatus of the present invention.

The receiving unit 53 performs demodulation, decoding, and error correction of a signal received by the antenna 48 in accordance with need and outputs a signal obtained thereby to the signal processing unit 54.

The signal processing unit 54 separates a signal input from the receiving unit 53 to, for example, an image signal and a sound signal and outputs the image signal to the display 49 and the sound signal to the speakers 51L and 51R.

Also, the signal processing unit 54 converts image signals input from the cameras $52_1$ and $52_2$ and sound signals input from the microphone 50 to a signal having a predetermined format for transmission and outputs it to the transmission unit 55.

The transmission unit 55 performs predetermined processing such as modulation on the signal input from the signal processing unit in accordance with need and outputs a signal obtained thereby to the antenna 48.

The display 49 of each of the multipoint communication terminal apparatuses $5_1$ to $5_3$, for example, displays images of faces of users participating in the multipoint communication, images of a common commercial, etc.

At this time, a user of the one of the multipoint communication terminal apparatuses $5_1$ to $5_3$ having a predetermined selection right can designate whether or not to display a commercial on the display 49, the type of the commercial when displaying it, etc.

Below, an explanation will be made of the processing for selection of the common content performed in a multipoint communication terminal apparatus when displaying an image of a commercial or other common content on the displays 49 of the plurality of multipoint communication terminal apparatuses participating in the multipoint communication.

Note that the processing described below is generally controlled by the signal processing unit 54 of the multipoint communication terminal apparatus shown in FIG. 3.

Figure 4:
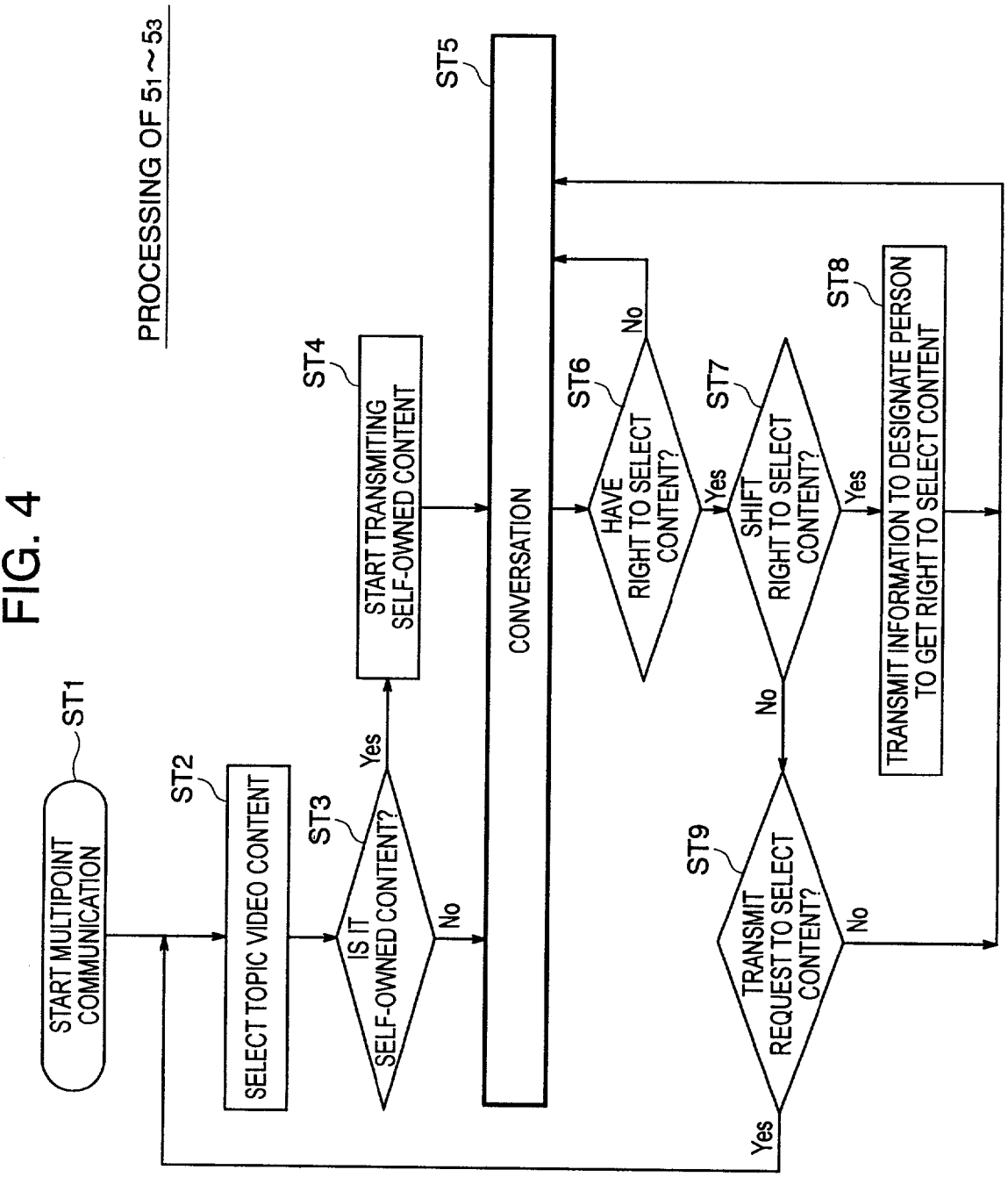
FIG. 4 is a flow chart of processing for selecting common content performed in the multipoint communication terminal apparatus when displaying a common commercial or other content on displays of a plurality of multipoint communication terminal apparatuses participating in multipoint communication shown in FIG. 1.

FIG. 4 is a flow chart for explaining the processing.

Step ST1: The multipoint communication terminal apparatus $5_1$ shown in FIG. 1 outputs a request for hosting multipoint communication, whereby multipoint communication is performed among the multipoint communication terminal apparatuses $5_1$ to $5_3$.

Step ST2: The user of the multipoint communication terminal apparatus $5_1$ which outputs the request for hosting the multipoint communication uses the multipoint communication terminal apparatus $5_1$ to select common content to be displayed on the displays 49 of the multipoint communication terminal apparatuses $5_1$ to $5_3$ participating in the multipoint communication.

Step ST3: The multipoint communication terminal apparatus $5_1$ judges whether the common content selected at step ST2 is one provided by itself. It executes the processing of step ST4 when judging that it is provided by itself, while transmits information to specify the common content to the MCU 8 shown in FIG. 1 when judging that it is not.

Step ST4: The multipoint communication terminal apparatus $5_1$ transmits a content signal of the content selected at step ST2 to the MCU 8.

Step ST5: The multipoint communication terminal apparatus $5_1$ to $5_3$ perform multipoint communication under control by the MCU 8. At this time, the multipoint communication terminal apparatus $5_1$ to $5_3$ receives signals transmitted by the other of the multipoint communication terminal apparatuses $5_1$ to $5_3$ participating in the multipoint communication and a content signal of the content selected at step ST2.

Step ST6: The multipoint communication terminal apparatus $5_1$ to $5_3$ judges whether or not it has received a predetermined request regarding selection of content in accordance with an instruction by a user. The routine proceeds to step ST7 when it judges it is received, while returns to the processing at step ST5 when not.

Step ST7: The multipoint communication terminal apparatus $5_1$ to $5_3$ judges whether or not the request received at step ST6 requests to shift the right of selection of content.

The routine proceeds to the processing at step ST8 when it judges it does, while proceeds to the processing at step ST9 when it judges it does not.

Step ST8: The multipoint communication terminal apparatus $5_1$ to $5_3$ transmits a request for shifting the selection right specifying the user designated by the request received at step ST7 to the MCU 8 shown in FIG. 1.

Step ST9: The multipoint communication terminal apparatus $5_1$ to $5_3$ judges whether or not the request received at step ST6 is a request for selecting content.

The routine returns to step ST2 when it is, while returns to step ST5 when it is not.

(ASP 7)

The ASP 7 transmits a commercial and content data of a topical image, news program, movie, a predetermined live program, etc. to be provided to the multipoint communication terminal apparatuses $5_1$ to $5_3$ to the multipoint communication terminal apparatuses $5_1$ to $5_3$ via the personal computers 14, cellular phones $13_1$ and $13_2$, etc. of users participating in the multipoint communication via the MCU 8 or directly.

(MCU 8)

There are mainly two functions in the MCU 8.

Figure 5:
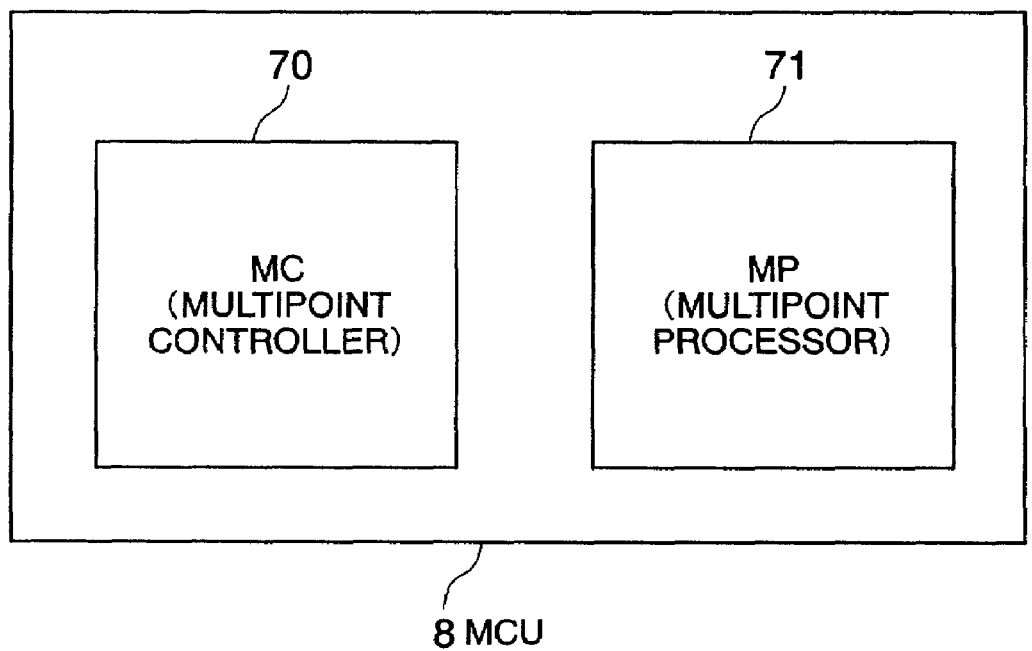
FIG. 5 is a block diagram of functions of an MCU shown in FIG. 1.

As shown in FIG. 5, one is that of a multipoint controller (MC) 70 for controlling multipoint communication terminal apparatuses to participate in the multipoint communication, while the other is that of a multipoint processor (MP) 71 for combining signals collected from the plurality of multipoint communication terminal apparatuses for the multipoint communication terminal apparatuses in accordance with control by the MC.

Also, the multipoint controller 70 transmits, for example, an image of a common commercial provided by the ASP 7 to the multipoint communication terminal apparatuses $5_1$ to $5_3$ in accordance with instructions (selection) from the multipoint communication terminal apparatus $5_1$ to $5_3$.

Also, the multipoint controller 70 provides content of a common image and sound for discussion to all of the multipoint communication terminal apparatuses $5_1$ to $5_3$ participating in the multipoint communication in accordance with a request from a user.

At this time, the multipoint controller 70 performs processing for setting the selection right for selecting the content, control for transmitting a content signal of a selected content to the multipoint communication terminal apparatuses, processing for changing the selection right, etc.

Figure 6:
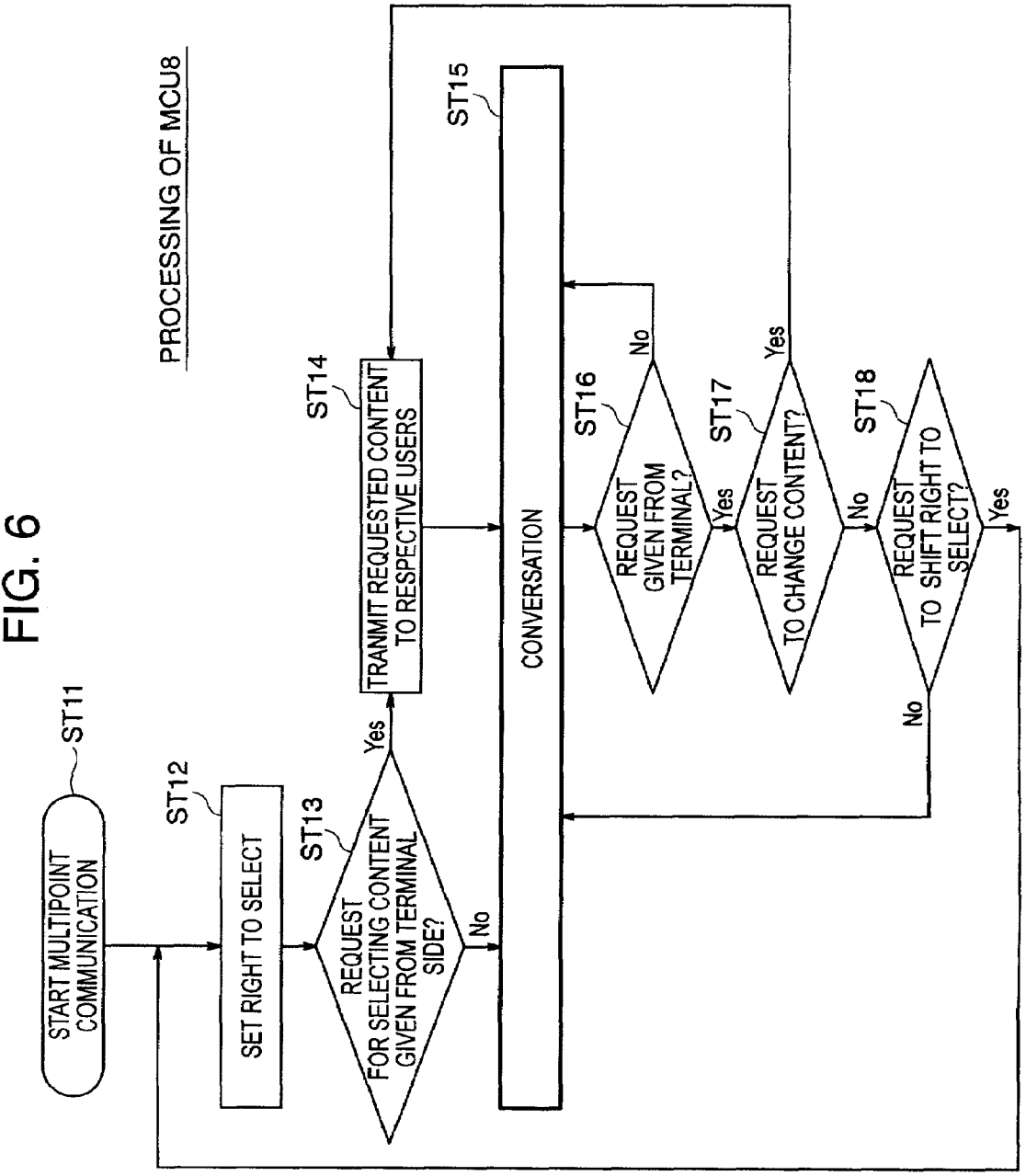
FIG. 6 is a flow chart of processing for selecting common content performed in the MCU when displaying a common commercial or other content on displays of a plurality of multipoint communication terminal apparatuses participating in multipoint communication shown in FIG. 1.

FIG. 6 is a flow chart of the processing.

Step ST11: The multipoint controller 70 inquires about participation in multipoint communication to designated multipoint communication terminal apparatuses in accordance with a request for hosting multipoint communication from a multipoint communication terminal apparatus of one user and starts multipoint communication among multipoint communication terminal apparatuses of users responding that they will participate in the multipoint communication.

In the present embodiment, for example, the multipoint communication terminal apparatus $5_1$ shown in FIG. 1 issues a request for hosting multipoint communication and multipoint communication is performed among the multipoint communication terminal apparatuses $5_1$ to $5_3$.

Step ST12: As an initial setting, the multipoint controller 70, for example, sets the selection right for selecting the above common content at the multipoint communication terminal apparatus $5_1$ which outputs a request for hosting the multipoint communication at step ST11.

At this time, the multipoint controller 70 controls communication so that the display 49 of the multipoint communication terminal apparatus $5_1$ set with the selection right displays a display pattern indicating that it has the selection right. At this time, the multipoint controller 70 may control communication so that all displays 49 of the multipoint communication terminal apparatuses $5_1$ to $5_3$ display the display pattern indicating that the multipoint communication terminal apparatus $5_1$ has the selection right.

Step ST13: The multipoint controller 70 judges whether or not it has received a selection request for selecting the above common image from the multipoint communication terminal apparatus $5_1$ set with the selection right. The routine proceeds to the processing at step ST14 when it judges that the selection request was received, while proceeds to processing at step ST15 when it judges it was not.

Step ST14: The multipoint controller 70 outputs a predetermined instruction to the ASP 7 and receives from the ASP 7 a content signal of the content specified by the selection request received at step ST13.

Step ST15: The multipoint controller 70 controls the multipoint processor 71 so as to combine the signals received from the multipoint communication terminal apparatuses $5_1$ to $5_3$ participating in the multipoint communication and the content signal input from the ASP 7 at step ST14 for the multipoint communication terminal apparatuses.

Step ST16: The multipoint controller 70 judges whether or not it has received a request from any of the multipoint communication terminal apparatuses $5_1$ to $5_3$. The routine proceeds to the processing of step ST17 when it judges it has received a request, while returns to processing at step ST15 when it judges it has not.

Step ST17: The multipoint controller 70 judges whether or not the request received at step ST 16 is a request for changing content. The routine returns to the processing at step ST14 when it judges it is a request for changing the content, while performs the processing at step ST18 when it judges it is not.

Step ST18: the multipoint controller 70 judges whether or not the request received at step ST16 is a request for changing the selection right. The routine returns to the processing at step ST12 when it judges it is a request for changing the selection right, while performs the processing at step ST15 when it is not.

(Charging Unit 9)

The charging unit 9 performs processing for charging the users of the multipoint communication terminal apparatuses for the service of the multipoint communication provided by the MCU 8.

In the charging processing, the charging unit 9 performs processing for suitably reducing the fee charged to the users for the multipoint communication service for example when the ASP 7 provides advertising information to the multipoint communication terminal apparatuses.

Also, the charging unit 9 performs processing for charging persons requesting the advertising information when the ASP 7 provides advertising information to the multipoint communication terminal apparatuses.

Below, a variety of displays of the display 49 of the multipoint communication terminal apparatus $5_1$ shown in FIG. 2 will be explained.

Note that the displays 49 of the multipoint communication terminal apparatuses $5_2$ and $5_3$ can also display the same displays as the multipoint communication terminal apparatus $5_1$.

Also, the images displayed on the displays 49 of the multipoint communication terminal apparatuses $5_1$ to $5_3$ and the arrangement of the images on the displays 49 are generally controlled by the MCU 8 shown in FIG. 1.

FIG. 7 gives views for explaining the case of displaying images of a commercial and faces of other parties of the multipoint communication on the display 49 of the multipoint communication terminal apparatus $5_1$.

Figure 7A:
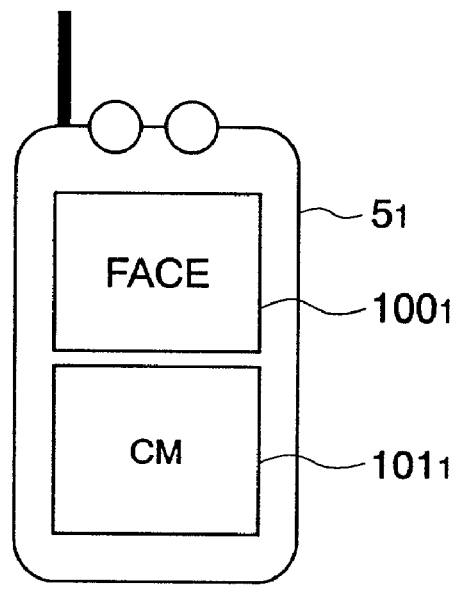
FIGS. 7A to 7D are views for explaining display formats of the display of the multipoint communication terminal apparatus shown in FIG. 1.

In the example shown in FIG. 7A, when the multipoint communication terminal apparatus $5_1$ is communicating, for example, with the multipoint communication terminal apparatus $5_2$, an image $100_1$ of a face of the user of the other party picked up by the camera 52 of the multipoint communication terminal apparatus 52 and an image $101_1$ of a commercial provided by the ASP 7 are displayed on the display 49 of the multipoint communication terminal apparatus $5_1$.

At this time, the commercial image $101_1$ is displayed below the image $100_1$ of the other party's face on the display 49. The image $100_1$ and the image $101_1$ are substantially the same size.

Figure 7B:
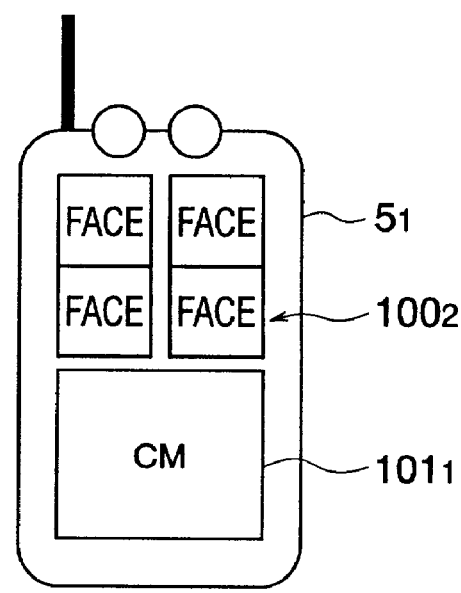

In an example shown in FIG. 7B, for example, when the multipoint communication terminal apparatus $5_1$ is engaged in multipoint communication with four other multipoint communication terminal apparatuses, images $100_2$ of other four users picked up by the cameras $52_2$ of the other multipoint communication terminal apparatuses and the commercial image $101_1$ provided by the ASP 7 are displayed on the display 49 of the multipoint communication terminal apparatus $5_1$.

At this time, the commercial image $101_1$ is displayed below the images $100_2$ of the faces of the four other parties on the display 49. Also, the image $101_1$ is larger than the images $100_2$ of the users' faces.

Note that an image of the user's own face may also be displayed on the display 49 of the multipoint communication terminal apparatus $5_1$.

Figure 7C:
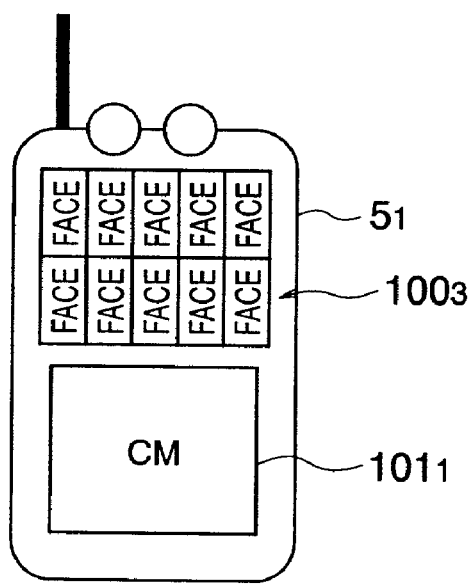

In an example shown in FIG. 7C, for example, when the multipoint communication terminal apparatus $5_1$ is engaged in multipoint communication with 10 other multipoint communication terminal apparatuses, images $100_3$ of the faces of the 10 users as other parties picked up by the cameras $52_2$ of the other multipoint communication terminal apparatuses and the commercial image $101_1$ provided by the ASP 7 are displayed on the display 49 of the multipoint communication terminal apparatus $5_1$.

At this time, the commercial image $101_1$ is displayed below the images $100_3$ of the other 10 users' faces on the display 49.

Figure 7D:
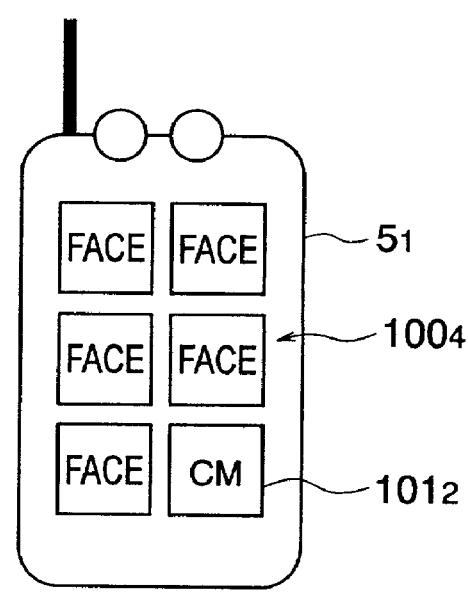

In an example shown in FIG. 7D, for example, when the multipoint communication terminal apparatus $5_1$ is engaged in multipoint communication with five other multipoint communication terminal apparatuses, images $100_4$ of faces of five users of other parties picked up by the cameras $52_2$ of the other multipoint communication terminal apparatuses and a commercial image $101_2$ provided by the ASP 7 are displayed on the display 49 of the multipoint communication terminal apparatus $5_1$.

At this time, the images $100_4$ of the users' faces and the commercial image $101_2$ are the same size and are arranged in a matrix on the display 49.

FIG. 8 gives views for explaining the case of displaying an image of faces of other parties in the multipoint communication and a topical image on the display 49.

Figure 8A:
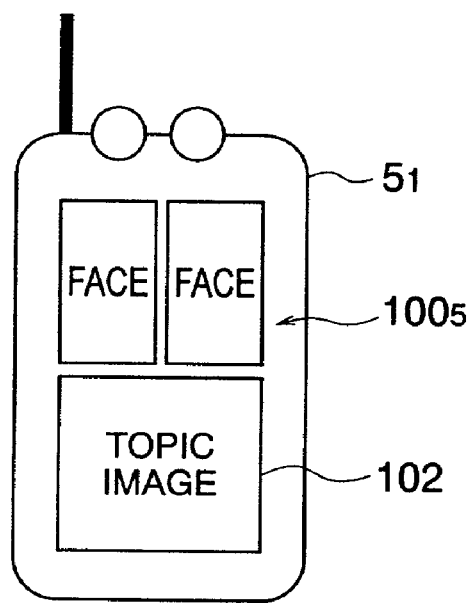
FIGS. 8A to 8D are views for explaining display formats of the display of the multipoint communication terminal apparatus shown in FIG. 1.

In an example shown in FIG. 8A, when the multipoint communication terminal apparatus $5_1$ is engaged in multipoint communication with multipoint communication terminal apparatuses $5_2$ and $5_3$, images $100_5$ of faces of users as other parties picked up by the cameras $52_2$ of the multipoint communication terminal apparatuses $5_2$ and 53 and a topical image 102 provided by the ASP 7 are displayed on the display 49 of the multipoint communication terminal apparatus $5_1$.

At this time, the images $100_5$ of the other parties' faces are displayed below the topical image 102 on the display 49.

The topical image 102 is, for example, an image transmitted by any one of the multipoint communication terminal apparatuses participating in the multipoint communication or an image of a content provided by the ASP 7 shown in FIG. 1, etc.

Figure 8B:
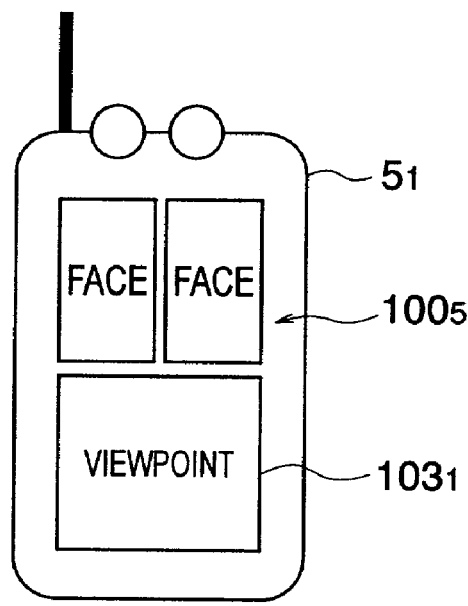

In an example shown in FIG. 8B, as the topical image 102 shown in FIG. 8A, for example, an image $103_1$ from the user's perspective picked up by the camera $52_1$ of the multipoint communication terminal apparatus $5_1$ or $5_2$ participating in the multipoint communication is used.

The user of the multipoint communication terminal apparatus $5_1$ can converse while viewing the image $103_1$ of the result of the image picked up from the perspective of the user of the multipoint communication terminal apparatus $5_2$.

Figure 8C:
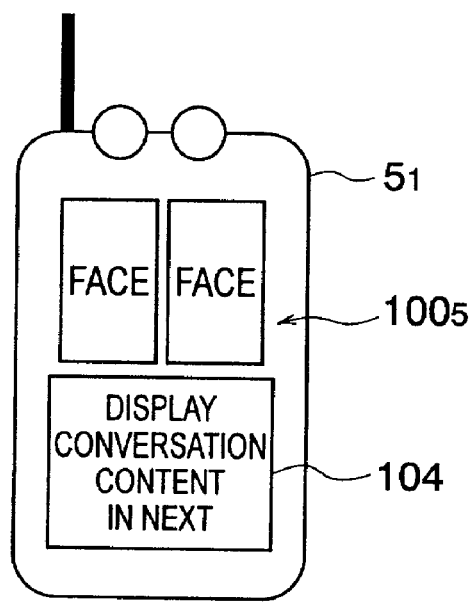

In an example shown in FIG. 8C, when the multipoint communication terminal apparatus $5_1$ is communicating, for example, with multipoint communication terminal apparatuses $5_2$ and $5_3$, images $100_5$ of faces of other parties picked up by the cameras $52_2$ of the multipoint communication terminal apparatuses $5_2$ and $5_3$ and an image 104 displaying content of a conversation carried out in the multipoint communication in a text format are displayed on the display 49.

Figure 8D:
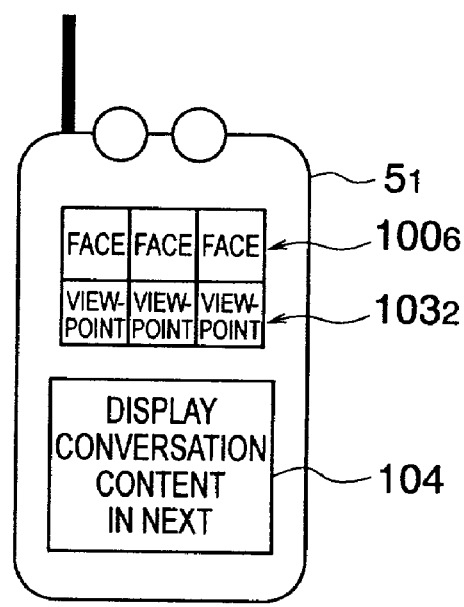

In this case, signals indicating the images picked up by the camera $52_1$ and the camera $52_2$ of the four multipoint communication terminal apparatuses including the multipoint communication terminal apparatus $5_1$ are transmitted from the multipoint communication terminal apparatuses to the MCU 8, where the signals are controlled so as to be displayed in correspondence on one screen on the display 49 as shown in FIG. 8D.

In the above display format of the display 49 of the communication terminal apparatus $5_1$, the case of displaying faces of the communication parties is illustrated, but as shown in FIG. 9 and FIG. 10, a display format not displaying the faces of other communication parties on the display 49 is also possible.

In this case, the images displayed on the display 49 are provided, for example, by the ASP 7 shown in FIG. 1.

Figure 9A:
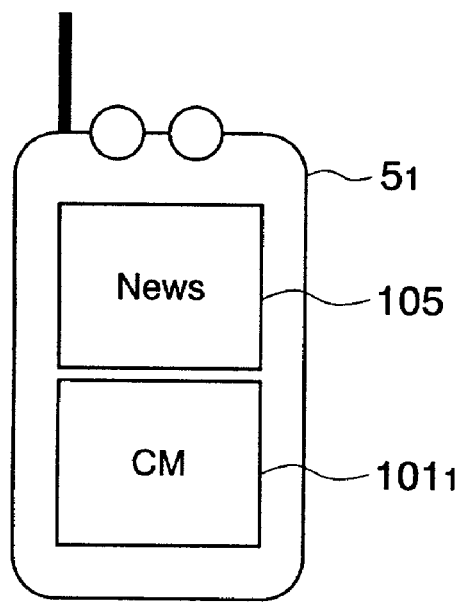
FIGS. 9A to 9D are views for explaining display formats of the display of the multipoint communication terminal apparatus shown in FIG. 1.

In an example shown in FIG. 9A, the commercial image $101_1$ and an image 105 of a news program are displayed on the display 49 of the multipoint communication terminal apparatus $5_1$.

Figure 9B:
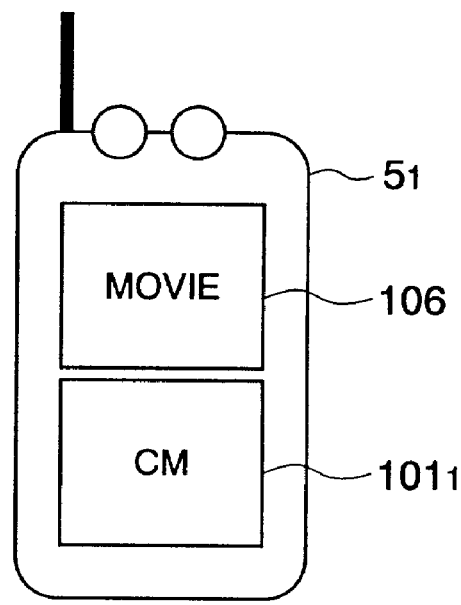

In an example shown in FIG. 9B, the commercial image $101_1$ and a movie image 106 are displayed on the display 49.

Figure 9C:
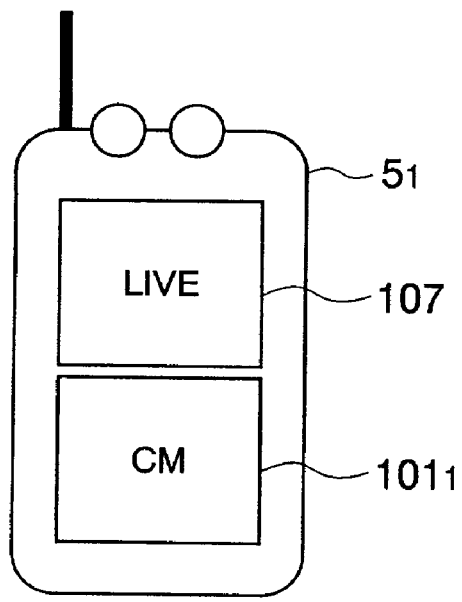

In an example shown in FIG. 9C, the commercial image $101_1$ and an image 107 of a live program of sports etc. are displayed on the display 49 of the multipoint communication terminal apparatus $5_1$.

Figure 9D:
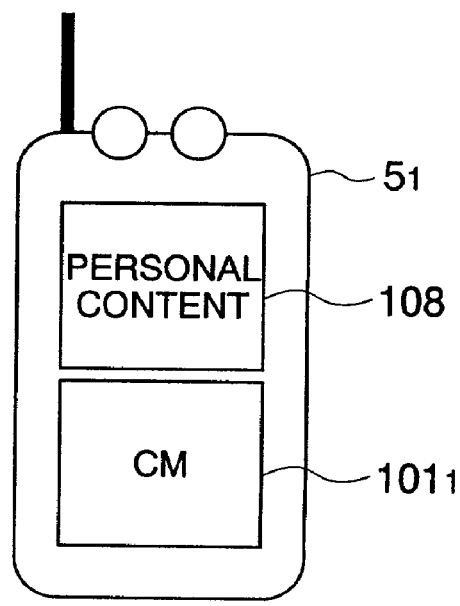

In an example shown in FIG. 9D, the commercial image $101_1$ and, for example, an image 108 of a private content provided by a multipoint communication terminal apparatus are displayed.

Figure 10A:
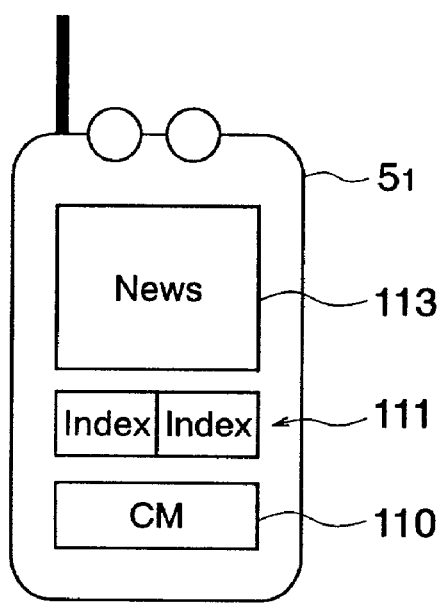
FIGS. 10A to 10C are views for explaining display formats of the display of the multipoint communication terminal apparatus shown in FIG. 1.

In an example shown in FIG. 10A, a commercial image 110, a news image 113, and images 111 of indexes of the news are displayed on the display 49 of the multipoint communication terminal apparatus $5_1$.

Figure 10B:
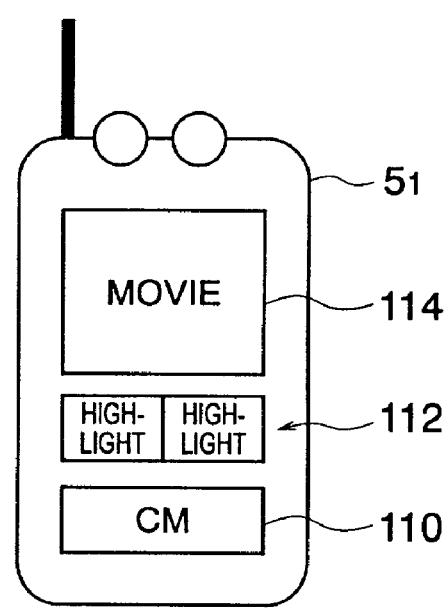

In an example shown in FIG. 10B, the commercial image 110, a movie image 114, and images 112 of highlights of the movie are displayed on the display 49 of the multipoint communication terminal apparatus $5_1$.

Figure 10C:
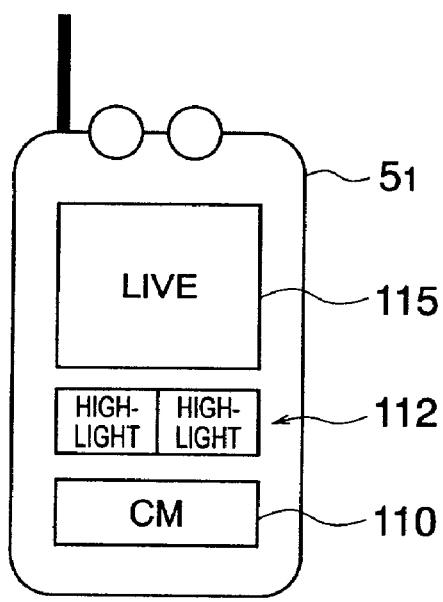

In an example shown in FIG. 10c, the commercial image 110, an image of a live program of sports etc., and images 112 of highlights of the live program are displayed on the display 49 of the multipoint communication terminal apparatus $5_1$.

Below, examples of operation of the multipoint communication system 1 will be explained.

For example, the multipoint communication terminal apparatus $5_1$ shown in FIG. 1 transmits a request for hosting multipoint communication designating the multipoint communication terminal apparatuses $5_2$ and $5_3$ as the participants to the MCU 8 via the personal computer 14.

When receiving the request for hosting multipoint communication, the MCU 8 inquires to the multipoint communication terminal apparatuses $5_2$ and $5_3$ for their participation.

When receiving responses of participation from the multipoint communication terminal apparatuses $5_2$ and $5_3$, the MCU 8 controls communication for multipoint communication among the multipoint communication terminal apparatuses $5_1$ to $5_3$.

As a result, for example, signals of images of faces of the users of the multipoint communication terminal apparatuses $5_1$ to $5_3$ are transmitted from the MCU 8.

Also, for example, when the MCU 8 receives an instruction requesting provision of a commercials from the multipoint communication terminal apparatus $5_1$ having a selection right for selecting a common content, the MCU 8 outputs an instruction to the ASP 7, for example, to output a signal of an image of a commercial of a type designated by the request.

Then, the MCU 8 generates a signal obtained by combining images of users' faces received from the multipoint communication terminal apparatuses $5_1$ to $5_3$ and a commercial image input from the ASP 7 or a signal for generating an image combined in the multipoint communication terminal apparatuses and transmits the signal to the multipoint communication terminal apparatuses $5_1$ to $5_3$.

At this time, the MCU 8 also transmits a combined signal of sound signals received from the multipoint communication terminal apparatuses $5_1$ to $5_3$ to the multipoint communication terminal apparatuses $5_1$ to $5_3$.

The multipoint communication terminal apparatuses $5_1$ to $5_3$ display images of the other users' faces and a commercial image on the displays 49. The users converse while viewing the images.

At this time, the charging unit 9 reduces the fee charged for the multipoint communication to the multipoint communication terminal apparatuses $5_1$ to $5_3$ receiving the provision of the commercial.

As explained above, according to the multipoint communication system 1, a common commercial can be displayed on the displays 49 of all of the users' multipoint communication terminal apparatuses by selection by a user. Thus, there is a high possibility that users participating in the multipoint communication will make the same commercial as the topic of the conversation when viewing it, so the effects of the commercial can be improved.

Also, according to the multipoint communication system 1, it is possible to select whether or not to display a commercial on the displays 49 of the multipoint communication terminal apparatuses. When selecting to display a commercial, fees charged to the users for the multipoint communication can be reduced. Also, a service provider of the multipoint communication system 1 can obtain advertising fees from commercial clients.

Also, according to the multipoint communication system 1, by enabling the users to select what kind of commercial to be displayed on the display 49, it is possible to provide a commercial which suits the tastes of the users and the effects of the commercial can be improved.

Also, according to the multipoint communication system 1, by enabling a shift of the selection right, any user participating in the multipoint communication can select a commercial which he or she is interested in.

Also, according to the multipoint communication system 1, by displaying topical common content on the displays 49 of the multipoint communication terminal apparatuses, conversation among a plurality of persons can become closer to actual face-to-face conversation. As a result, conversation conducted via multipoint communication can be stimulated and added value can be given to the multipoint communication service. Also, the amount of information conveyed via the multipoint communication can be made larger. This contributes to development of the information industry.

Second Embodiment

In the above embodiment, a case where multipoint communication terminal apparatuses, not personal computers and cellular phones, were provided was described as an example, but personal computers and cellular phones may have the functions of the multipoint communication terminal apparatuses explained in the above embodiment. Note that in the present embodiment, a case where cellular phones are given the above functions of the multipoint communication terminal apparatuses will be explained.

Also, in the present embodiment, a case where a plurality of MCUs are provided will be explained.

Figure 11:
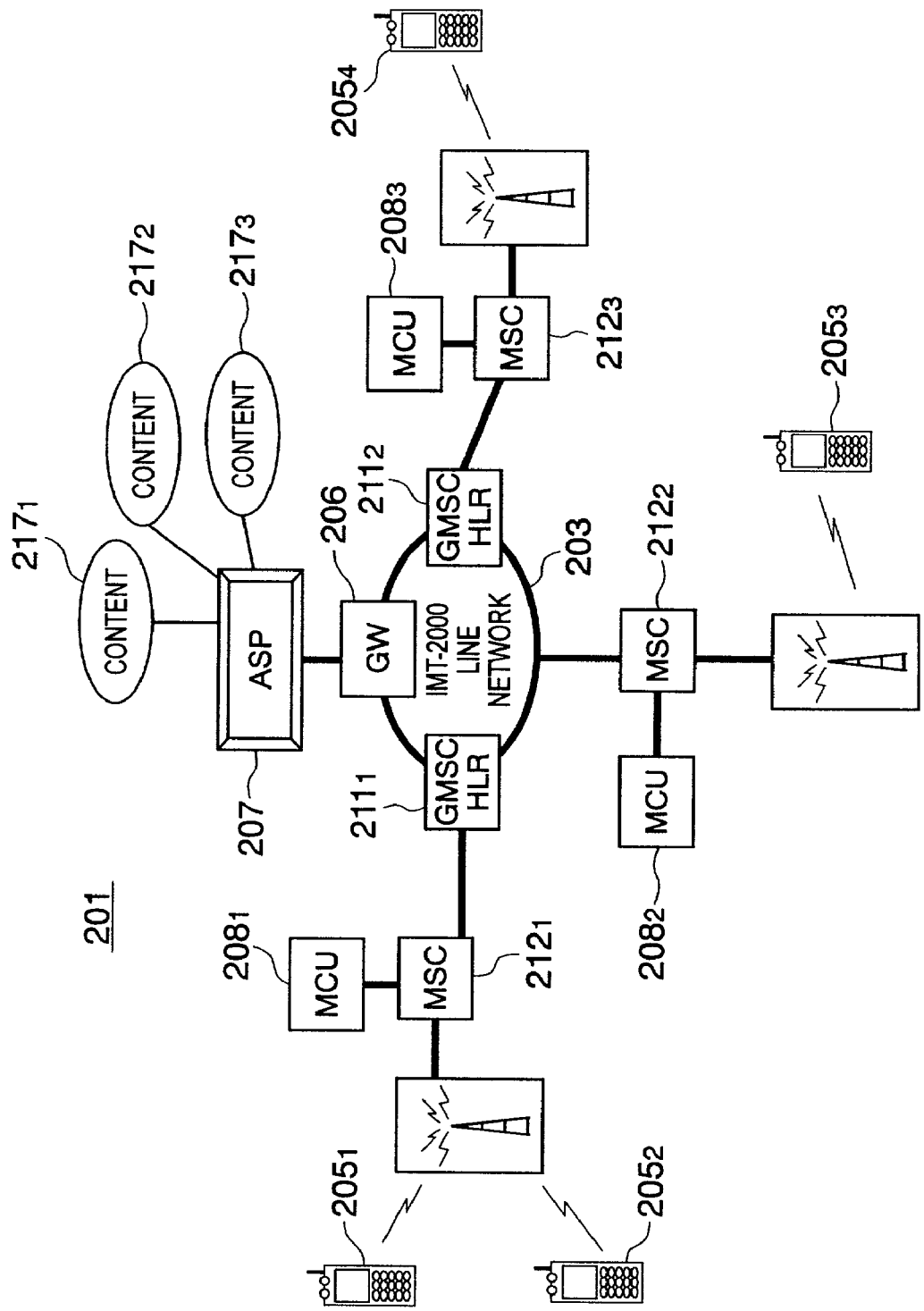
FIG. 11 is a view of the configuration of a multipoint communication system according to a second embodiment of the present invention.

FIG. 11 is a view of the configuration of a multipoint communication system 201 of the present embodiment.

As shown in FIG. 11, in the multipoint communication system 201, an ASP 207 is connected to an IMT-2000 line network 203 via a gateway 206.

Also, a gateway mobile exchange $211_1$ of the IMT-2000 line network 203 is connected to a mobile exchange $212_1$. The mobile exchange $212_1$ is connected to the MCU 2081 and communicates with cellular phones $205_1$ and $205_2$.

Also, the gateway mobile exchange $211_2$ of the IMT-2000 line network 203 is connected to a mobile exchange $212_2$. The mobile exchange $212_2$ is connected to the MCU $208_3$ and communicates, for example, with a cellular phone $205_4$.

Also, the IMT-2000 line network 203 is connected to an MCU $208_2$ via a mobile exchange $212_2$. The MCU $208_2$ communicates with a cellular phone $205_3$.

In the multipoint communication system 201, the functions of the ASP 207 and the MCU $208_1$ to $208_3$ are basically the same as those of the ASP 7 and MCU 8 in the first embodiment.

Note that, when a cellular phone in their service range sends a request for hosting multipoint communication, the MCUs $208_1$ to $208_3$ becomes MCUs for generally controlling the multipoint communication.

Also, as a line network, for example, a cellular phone line network, IP network line network, etc. may be used other than the IMT-2000 line network 203.

The present embodiment has characteristics in a display format and a method of selecting images of the cellular phones $205_1$ to $205_4$.

Figure 12:
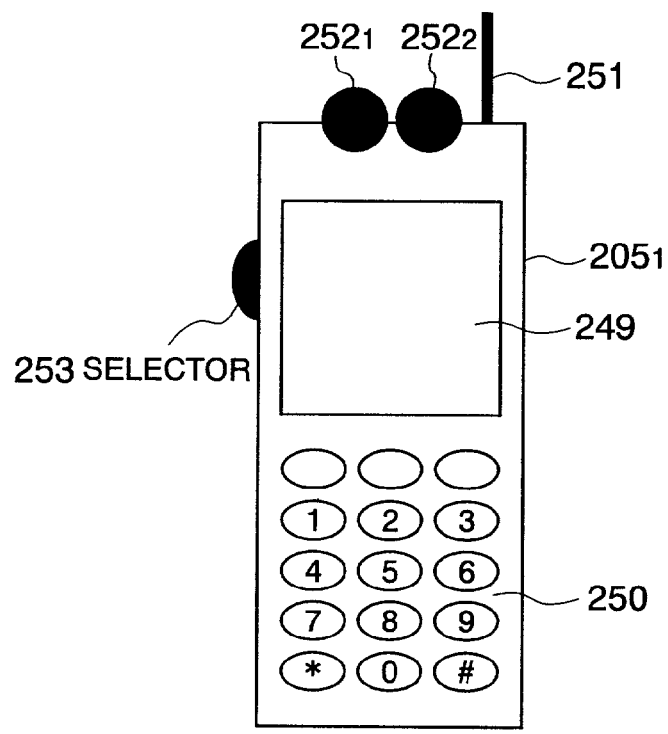
FIG. 12 is a view of the appearance of the front of a cellular phone shown in FIG. 11.

FIG. 12 is a view of the appearance of the front of the cellular phone $205_1$.

Note that the cellular phones $205_2$ to $205_4$ are the same as, for example, the cellular phone $205_1$.

As shown in FIG. 12, the cellular phone $205_1$ comprises a display 249, operation buttons 250, an antenna 251, and cameras $252_1$ and $252_2$ placed above the display 249 in the figure and a selector 253 placed on the left side of the display 249 in the figure.

Here, the operation buttons 250, receiving unit 253, signal processing unit 254, and display 249 correspond to an operation means, receiving means, signal processing means, and display means of the communication apparatus of the present invention, respectively.

The display 249 is, for example, a liquid crystal display.

The operation buttons 250 comprise, for example, 15 buttons arranged in a matrix of 3×5. Of these, 10 buttons form the 10-keys.

The camera $252_1$ is a camera for picking up a view of a direction of a user's perspective of the cellular phone $205_1$.

The camera $252_2$ is a camera for picking up, for example, a face of the user of the cellular phone $205_1$.

The selector 253 is used for selecting an image to be displayed on the display 249 or selecting an image to be displayed enlarged among images displayed reduced on the display 249.

The cellular phone $205_1$ also has a function of, for example, the cellular phone $13_1$ and the multipoint communication terminal apparatus $5_2$ in the above first embodiment. Namely, the cellular phone $13_1$ has a function of a normal cellular phone and a function of displaying a variety of images as described in the above first embodiment.

The display 249 of the cellular phone $205_1$ displays, for example, image blocks "1" to "6" arranged in a matrix of 2(vertical)×3(lateral) as shown in FIG. 13 in accordance with a signal received from the MCUs $208_1$, $208_2$, and $208_3$ shown in FIG. 11.

Note that the MCUs $208_1$ to $208_3$ transmit to the cellular phone $205_1$ display position instruction information about an arrangement of displaying the image blocks "1" to "6", on the display 249. The cellular phone $205_1$ displays the image blocks "1" to "6" at predetermined positions in a matrix based on the display position instruction information.

The images displayed on the image blocks are moving pictures, still pictures, etc.

Figure 13A:
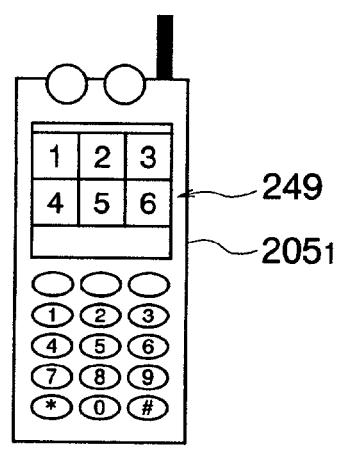
FIGS. 13A to 13D are views for explaining an example of a display format of a display of the cellular phone shown in FIG. 12.
Figure 13B:
Figure 13C:
Figure 13D:
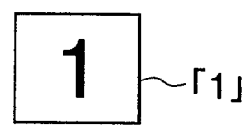

At this time, numbers "1" to "6" indicating correspondence between the image blocks and the operation buttons 250 may be displayed as shown in FIG. 13B on the image blocks or not be displayed as shown in FIGS. 13C and D.

In the example shown in FIG. 13C, "1" is indicated on the upper left of the image block "1". In the example shown in FIG. 13D, a semitransparent or opaque "1" is displayed so as to be superimposed on the image of the image block "1".

Figure 14A:
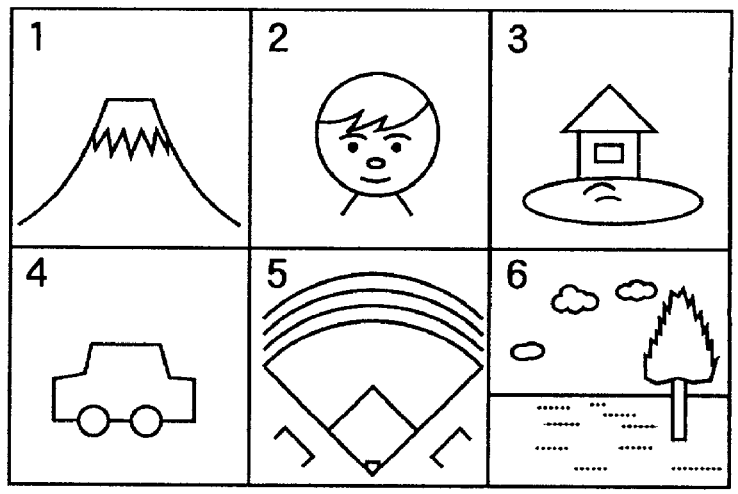
FIGS. 14A and 14B are views for explaining a method of selection of an image block in the cellular phone shown in FIG. 12.
Figure 14B:
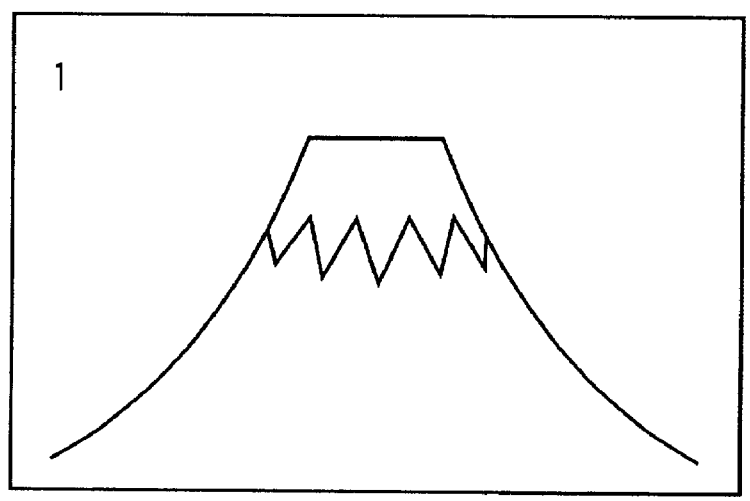

FIG. 14A is an example of images displayed on the image blocks in the case shown in FIG. 13.

As shown in FIG. 14A, for example, an image of a mountain is displayed on the image block "1" displayed on the display 249. Also, a human face is displayed on the image block "2". A view of a house is displayed on the image block "3". A car is displayed on the image block "4". A baseball field is displayed on the image block "5". A view including a tree is displayed on the image block "6".

Here, the image blocks "1" to "6", are arranged in a matrix of 2(vertical)×3(lateral) so as to correspond to the arrangement of the numeric keys "1" to "6" shown in FIG. 12.

To select the image block "1" as the image to be enlarged among the image blocks "1" to "6" displayed on the display 249, the user views the number displayed at the upper left in the image blocks and presses the button "1" of the operation buttons 250.

As a result, as shown in FIG. 14A, the image block "1" is displayed enlarged on the display 249 of the multipoint communication terminal apparatus $5_1$.

Note that, when the button "1" of the operation buttons 250 is pressed, an image for enlarged display of the image block "1" or an image of a moving picture may be made requested from the cellular phone 205, to the MCUs $208_1$ to $208_3$ shown in FIG. 11 and the cellular phone $205_1$ may receive the corresponding image from the MCUs $208_1$ to $208_3$ for display.

Figure 15A:
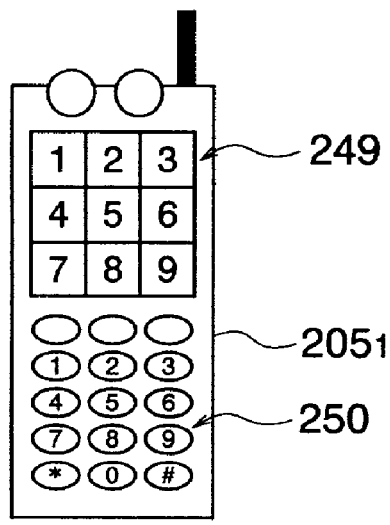
FIGS. 15A to 15C are views for explaining an example of a display format of a display of the cellular phone shown in FIG. 12.

Note that as a display format of the display 249 of the cellular phone $205_1$, for example, as shown in FIG. 15A, image blocks "1" to "9" may be displayed so as to correspond to the nine numeric keys "1" to "9" of the operation buttons 250 arranged in a matrix of 3×3.

Figure 15B:
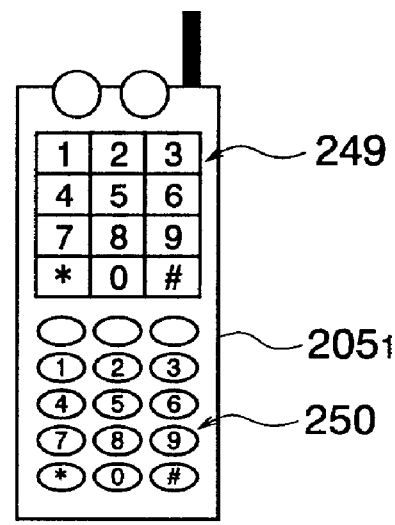

Also, for example, as shown in FIG. 15B, image blocks "1" to "9", "*", "0", and "#" may be displayed so as to correspond to 12 keys of the operation buttons 250 arranged in a matrix of 4(vertical)×3(lateral), that is, numeric keys "1" to "9", an operation button "*", numeric key "0", and operation button "#".

Also, for example, as shown in FIG. 15B, image blocks "a", "b", "c", "1" to "9", "*", "0", and "#" may be displayed so as to correspond to 15 keys of the operation buttons 250 arranged in a matrix of 5(vertical)×3(lateral), that is, operation buttons "a", "b", "c", numeric keys "1" to "9", an operation button "*", numeric key "0", and operation button "#".

Figure 15C:
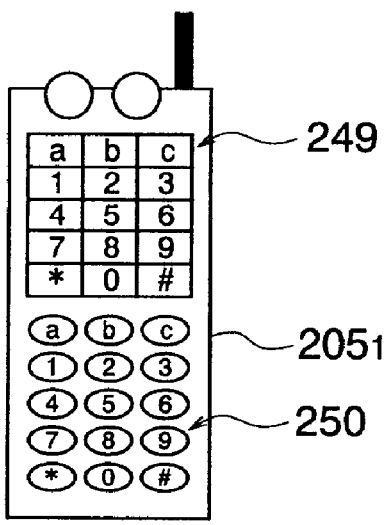

In the above cases in FIGS. 15A to 15C, a corresponding image block is displayed enlarged on the display 249 by pressing the corresponding operation button or numeric key.

Figure 16A:
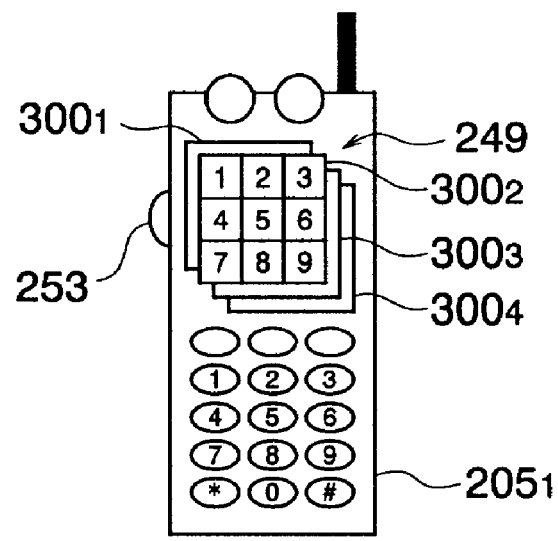
FIGS. 16A and 16B are views for explaining an example of a display format of a display of the cellular phone shown in FIG. 12.

Also, as shown in FIG. 16A, display patterns $300_1$ to $300_4$ each displaying, for example, a total of 9 image blocks arranged in a matrix of 3×3 may be displayed on the display 249. Image blocks "1" to "9" included in one display pattern selected therefrom may be displayed. FIG. 16A shows a case where a display pattern $300_2$ is selected.

To display an image block included in another display pattern on the display 249, the user operates the selector 253 to select a desired display pattern for display. As a result, image blocks "1" to "9" included in the selected display pattern are displayed on the display 249.

The selector 253 comprises, for example, a rotatable hemisphere. A user rotates the hemisphere with a finger etc. to position a predetermined pointer on the display patterns $300_1$ to $300_4$ to be selected and presses the hemisphere in that state a predetermined times with a finger etc. to select a display pattern.

Figure 16B:
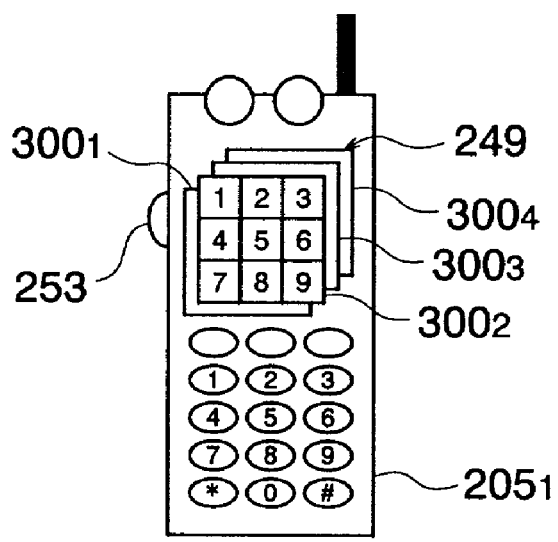

Note that the display patterns $300_1$ to $300_4$ may be displayed on the display 249, for example, in an arrangement shown in FIG. 16B.

As explained above, according to the multipoint communication system 201, there are effects below in addition to the effects of the multipoint communication system 1 of the above first embodiment.

Namely, as explained with reference to FIGS. 12 to 16, by displaying a plurality of image blocks on the display 249 so as to correspond to the button arrangement of the operation buttons 250 and by displaying enlarged one image block by operating an operation button, the operation for selecting an image block becomes easy for users.

Note that in the above embodiments, the sound signal is an audio signal and includes music information and other acoustic information in addition to information of the human voice.

As explained above, according to the present invention, there is provided a communication control apparatus, a communication apparatus, and a communication system friendly to users and a method for the same.

Also, according to the present invention, there is provided a communication control apparatus, a communication apparatus, and a communication system convenient for a service provider of multipoint communication in business and a method for the same.

While the invention has been described with reference to specific embodiment chosen for purpose of illustration, it should be apparent that numerous modifications could be made thereto by those skilled in the art without departing from the basic concept and scope of the invention.

What is claimed is:

1. A communication control apparatus for controlling multipoint communication performed using a plurality of communication apparatuses connected via a communication line, comprising:
   a control means for controlling communication so as to transmit signals received from said plurality of communication apparatuses and a signal for providing predetermined advertising information to said plurality of communication apparatuses,
   wherein said control means determines the type of advertising information to be provided in accordance with an instruction from a communication apparatus, and
   wherein the instruction instructs whether to transmit a signal for providing the determined type of said advertising information to said communication apparatuses and whether to enable users to select a personal type of advertising information.

2. A communication control apparatus as set forth in claim 1, wherein said control means controls communication so that said communication apparatuses display images in accordance with the signals received from said plurality of communication apparatuses and an image in accordance with the signal for providing said predetermined advertising information on one screen.

3. A communication control apparatus as set forth in claim 1, wherein said control means assigns a predetermined selection right to a communication apparatus and allows said communication apparatus assigned the selection right to give said instruction.

4. A communication control apparatus as set forth in claim 3, wherein said control means changes said communication apparatus assigned said selection right in accordance with a request from a communication apparatus.

5. A communication control apparatus as set forth in claim 3, wherein said control means transmits a signal for a display for specifying said communication apparatus assigned said selection right to said plurality of communication apparatuses.

6. A communication control apparatus as set forth in claim 1, wherein said control means determines whether or not to transmit a signal for providing said advertising information in accordance with an instruction from a communication apparatus.

7. A communication control apparatus as set forth in claim 1, wherein said signals received from the communication apparatuses are signals for displaying faces of users of the communication apparatuses.

8. A communication control apparatus as set forth in claim 7, wherein said control means controls communication so that a communication apparatus displays a second image in accordance with said predetermined advertising information larger compared with first images in accordance with signals received from said plurality of communication apparatuses.

9. A communication control apparatus as set forth in claim 8, wherein said control means controls communication so that said second image is displayed below said first images in a display screen of said communication apparatus.

10. A communication control apparatus as set forth in claim 1, further comprising a charging means for determining fees to be charged to users of said communication apparatuses for use of said multipoint communication in accordance with provision of said advertising information.

11. A communication control apparatus as set forth in claim 1, wherein said control means controls communication so as to transmit sound signals received from said plurality of communication apparatuses to said plurality of communication apparatuses.

12. A communication control apparatus for controlling multipoint communication performed using a plurality of communication apparatuses connected via communication lines, comprising;
  a control means for controlling communication so as to transmit signals received from said plurality of communication apparatuses and a content signal specified by a communication apparatus to said plurality of communication apparatuses,
  wherein said control means determines the type of content signal to be provided in accordance with an instruction from a communication, and
  wherein the instruction instructs whether to transmit a signal for providing the determined type of said advertising information to said communication apparatuses and whether to enable users to select a personal type of advertising information.

13. A communication control apparatus as set forth in claim 12, wherein said control means controls communication so that said communication apparatuses display images in accordance with the signals received from said plurality of communication apparatuses and an image in accordance with said content signal on one screen.

14. A communication control apparatus as set forth in claim 12, wherein said control means assigns a predetermined selection right to a communication apparatus and allows said communication apparatus assigned the selection right to designate said content signal.

15. A communication control apparatus as set forth in claim 14, wherein said control means changes said communication apparatus assigned said selection right in accordance with a request from a communication apparatus.

16. A communication control apparatus as set forth in claim 14, wherein said control means transmits a signal for a display for specifying said communication apparatus assigned said selection right to said plurality of communication apparatuses.

17. A communication control apparatus as set forth in claim 12, wherein the signals received from said communication apparatuses are signals for displaying faces of users of the communication apparatuses.

18. A communication control apparatus as set forth in claim 12, wherein said control means controls communication so as to transmit sound signals received from said plurality of communication apparatuses to said plurality of communication apparatuses.

19. A communication control apparatus as set forth in claim 18, wherein, when the signals received from said plurality of communication apparatuses are sound signals, said control means recognizes sounds indicated by the sound signals and controls communication so as to transmit signals indicating the recognized sounds by text to said plurality of communication apparatuses.

20. A communication apparatus for multipoint communication with a plurality of other communication apparatuses via communication lines, comprising:
  a receiving means for receiving first signals transmitted by said plurality of other communication apparatuses and a second signal indicating predetermined advertising information and
  a signal processing means for processing for simultaneously displaying images in accordance with said first signals and an image in accordance with said second signal,
  wherein said receiving means determines the type of advertising information to be provided in accordance with an instruction from a communication, and
  wherein the instruction instructs whether to transmit a signal for providing the determined type of said advertising information to said communication apparatuses and whether to enable users to select a personal type of advertising information.

21. A communication apparatus for multipoint communication with a plurality of other communication apparatuses via communication lines, comprising:
  a receiving means for receiving first signals transmitted by said other plurality of communication apparatuses and a second signal of a content designated by said communication apparatus;
  a display means; and
  a signal processing means for simultaneously displaying by said display means images in accordance with said first signals and an image in accordance with said second signal,
  wherein said receiving means determines the type of content to be provided in accordance with an instruction from a communication apparatus, and
  wherein the instruction instructs whether to transmit a signal for providing the determined type of said advertising information to said communication apparatuses and whether to enable users to select a personal type of advertising information.

22. A communication system for multipoint communication using a plurality of communication apparatuses via communication lines under control by a communication control apparatus, wherein: said communication control apparatus comprises
  a control means for controlling communication so as to transmit first signals received from said plurality of communication apparatuses and a second signal for providing predetermined advertising information to said plurality of communication apparatuses; and said communication apparatus comprises a display means and
  a signal processing means for processing so as to display images in accordance with said first signals and an image in accordance with said second signal on one screen by a display means,
  wherein said control means determines the type of advertising information to be provided in accordance with an instruction from a communication apparatus, and
  wherein the instruction instructs whether to transmit a signal for providing the determined type of said advertising information to said communication apparatuses and whether to enable users to select a personal type of advertising information.

23. A communication system for multipoint communication using a plurality of communication apparatuses via communication lines under control by a communication control apparatus, wherein: said communication control apparatus comprises a control means for controlling communication so as to transmit first signals received from said plurality of communication apparatuses and a second signal of a content designated by said communication apparatus to said plurality of communication apparatuses; and said communication apparatus comprises a display means and a signal processing means for processing so as to display images in accordance with said first signals and an image in accordance with said second signal on one screen by a display means, wherein said control means determines the type of content to be provided in accordance with an instruction from a communication apparatus, and wherein the instruction instructs whether or not to transmit a signal for providing the determined type of said advertising information to said communication apparatuses and whether or not to enable users to select a personal type of advertising information.

24. A communication method for controlling multipoint communication using a plurality of communication apparatuses connected via communication lines, including the step of controlling communication so as to transmit signals received from said plurality of communication apparatuses and a signal for providing predetermined advertising information to said plurality of communication apparatuses, wherein said controlling determines the type of advertising information to be provided in accordance with an instruction received from a communication, and wherein the instruction instructs whether to transmit a signal for providing the determined type of said advertising information to said communication apparatuses and whether to enable users to select a personal type of advertising information.

25. A communication method as set forth in claim 24, including the step of controlling communication so that said communication apparatuses display images in accordance with signals received from said plurality of communication apparatuses and an image in accordance with the signal for providing said predetermined advertising information on one screen.

26. A communication method as set forth in claim 24, including the steps of determining a type of said advertising information to be provided in accordance with an instruction from a communication apparatus and controlling communication so that a signal for providing said advertising information of the determined kind is transmitted to said communication apparatuses.

27. A communication method as set forth in claim 26, including the steps of assigning a predetermined selection right to a communication apparatus and allowing that communication apparatus assigned the selection right to give said instruction.

28. A communication method as set forth in claim 27, including the step of changing said communication apparatus assigned said selection right in accordance with a request from a communication apparatus.

29. A communication method as set forth in claim 27, including the step of transmitting a signal for display for specifying said communication apparatus assigned said selection right to said plurality of communication apparatuses.

30. A communication method as set forth in claim 24, including the step of determining whether or not to transmit a signal for providing said advertising information in accordance with an instruction from a communication apparatus.

31. A communication method as set forth in claim 24, wherein the signals received from said communication apparatuses are signals for displaying faces of users of the communication apparatuses.

32. A communication method as set forth in claim 31, including the step of controlling communication so that said communication apparatuses display a second image in accordance with said predetermined advertising information larger than first images in accordance with signals received from said plurality of communication apparatuses.

33. A communication method as set forth in claim 32, including the step of controlling communication so that said second image is displayed below said first images in a display screen of said communication apparatus.

34. A communication method as set forth in claim 24, including the step of determining fees to be charged to users of said communication apparatuses for use of said multipoint communication in accordance with provision of said advertising information.

35. A communication method as set forth in claim 24, including the step of controlling communication so as to transmit sound signals received from said plurality of communication apparatuses to said plurality of communication apparatuses.

36. A communication method for controlling multipoint communication using a plurality of communication apparatuses connected via communication lines, including the step of controlling communication so as to transmit signals received from said plurality of communication apparatuses and a content signal designated by a communication apparatus to said plurality of communication apparatuses, wherein said controlling determines the type of content signal to be provided in accordance with an instruction from a communication apparatus, and wherein the instruction instructs whether to transmit a signal for providing the determined type of said advertising information to said communication apparatuses and whether to enable users to select a personal type of advertising information.

37. A communication method as set forth in claim 36, including the step of controlling communication so that said communication apparatuses display images in accordance with signals received from said plurality of communication apparatuses and an image in accordance with said content signal on one screen.

38. A communication method as set forth in claim 36, including the step of assigning a predetermined selection right to a communication apparatus and allowing that communication apparatus assigned the selection right to designate said content signal.

39. A communication method as set forth in claim 38, including the step of changing said communication apparatus assigned said selection right in accordance with a request from said communication apparatus.

40. A communication method as set forth in claim 38, including the step of transmitting a signal for display for specifying said communication apparatus assigned said selection right to said plurality of communication apparatuses.

41. A communication method as set forth in claim 36, wherein the signals received from said communication apparatuses are signals for displaying faces of users of the communication apparatuses.

42. A communication method as set forth in claim 36, including the step of controlling communication so as to transmit sound signals received from said plurality of communication apparatuses to said plurality of communication apparatuses.

43. A communication method as set forth in claim 42, including the step of, when the signals received from said plurality of communication apparatuses are sound signals, recognizing sounds indicated by the sound signals and controlling communication so as to transmit signals indicating the recognized sounds by text to said plurality of communication apparatuses.

44. A communication control apparatus for controlling multipoint communication using a plurality of communication apparatuses connected via communication line, comprising
- a control means for controlling communication so as to transmit first signals indicating pickup results of faces of users of the communication apparatuses received from said plurality of communication apparatuses and second signals indicating pickup results in the directions of the users' perspectives to said plurality of communication apparatuses,
- wherein the control means determines a type of content signal to be provided in accordance with an instruction from a communication apparatus, and
- wherein the instruction instructs whether to transmit a signal for providing the determined type of said advertising information to said communication apparatuses and whether to enable users to select a personal type of advertising information.

45. A communication control apparatus as set forth in claim 44, wherein said control means controls communication so that first images in accordance with said first signals and second images in accordance with said second signals are displayed in correspondence on one screen by said display means of said communication apparatus.

46. A communication apparatus for multipoint communication with a plurality of other communication apparatuses via communication lines, comprising:
- a receiving means for receiving signals;
- a display means for display in accordance with said received signals;
- a first image pickup means for picking up an image of a face of a user of the communication apparatus;
- a second image pickup means for picking up an image in the direction of said user's perspective; and
- a transmission means for transmitting signals indicating the image pickup results of said first image pickup means and said second image pickup means,
- wherein said controlling determines the type of content signal to be provided in accordance with an instruction from a communication apparatus,
- wherein, when not displaying an image in the direction of said user's perspective, said second image pick-up means displays a type of content signal to be provided in accordance with an instruction from a communication apparatus, and
- wherein the instruction instructs whether to transmit a signal for providing the determined type of said advertising information to said communication apparatuses and whether to enable users to select a personal type of advertising information.

47. A communication apparatus as set forth in claim 46, wherein said display means displays first images in accordance with image pickup results of faces of users of said plurality of other communication apparatuses and second images in accordance with image pickup results in the directions of the users' perspectives.

48. A communication apparatus as set forth in claim 47, wherein said display means displays said first images and said second images in correspondence on one screen.

49. A communication method for controlling multipoint communication using a plurality of communication apparatuses connected via communication lines, including the step of
- controlling communication so as to transmit first signals indicating image pickup results of faces of users of the communication apparatuses received from said plurality of communication apparatuses and second signals indicating image pickup results in the directions of the users' perspectives to said plurality of communication apparatuses,
- wherein said controlling determines a type of content signal to be provided in accordance with an instruction from a communication apparatus, and
- wherein the instruction instructs whether to transmit a signal for providing the determined type of said advertising information to said communication apparatuses and whether to enable users to select a personal type of advertising information.

50. A communication method as set forth in claim 49, including the step of controlling communication so that first images in accordance with said first signals and second images in accordance with said second signals are displayed in correspondence on one screen in said display means of said communication apparatuses.

* * * * *